US012748887B2

(12) United States Patent
Amico

(10) Patent No.: US 12,748,887 B2
(45) Date of Patent: Sep. 29, 2026

(54) DATA PRIVACY AND SECURITY IN SMART DEVICES

(71) Applicant: PRIVACY4CARS, Inc., Marietta, GA (US)

(72) Inventor: Andrea Amico, Marietta, GA (US)

(73) Assignee: PRIVACY4CARS, Inc., Kennesaw, GA (US)

( * ) Notice: Subject to any disclaimer, the term of this patent is extended or adjusted under 35 U.S.C. 154(b) by 140 days.

(21) Appl. No.: 18/608,791

(22) Filed: Mar. 18, 2024

(65) Prior Publication Data

US 2025/0190618 A1 Jun. 12, 2025

Related U.S. Application Data

(63) Continuation-in-part of application No. 17/967,349, filed on Oct. 17, 2022, now Pat. No. 11,934,557, which is a continuation of application No. 17/829,675, filed on Jun. 1, 2022, now Pat. No. 11,494,514, which is a continuation-in-part of application No. 17/500,002, filed on Oct. 13, 2021, now Pat. No. 11,651,105, which is a continuation of application No. 16/279,389, filed on Feb. 19, 2019, now Pat. No. 11,157,648.

(60) Provisional application No. 62/632,707, filed on Feb. 20, 2018.

(51) Int. Cl.

| | |
|---|---|
| ***G06F 21/62*** | (2013.01) |
| ***G06F 21/73*** | (2013.01) |
| ***H04W 12/02*** | (2009.01) |

(52) U.S. Cl.
CPC ...... *G06F 21/6245* (2013.01); *G06F 21/6227* (2013.01); *G06F 21/73* (2013.01); *H04W 12/02* (2013.01); *G06F 2221/2143* (2013.01)

(58) Field of Classification Search
CPC .. G06F 21/6245; G06F 21/6227; G06F 21/73; G06F 2221/2143; H04W 12/02
See application file for complete search history.

(56) References Cited

U.S. PATENT DOCUMENTS

| | | | | |
|---|---|---|---|---|
| 6,725,444 | B2 * | 4/2004 | Fergus | G06F 21/6209 717/100 |
| 9,609,025 | B1 | 3/2017 | Betzler | |
| 9,773,409 | B1 * | 9/2017 | Sanders | G08C 17/02 |
| 10,747,898 | B2 | 8/2020 | Cai | |
| 10,824,758 | B2 | 11/2020 | Hankeln et al. | |

(Continued)

*Primary Examiner* — Robert B Leung
(74) *Attorney, Agent, or Firm* — HONIGMAN LLP

(57) ABSTRACT

Utilizing a user computing device to remove privacy information. The user computing device may obtain an input associated with a SD device or system from which privacy information of a user is to be removed. Using the input associated with the SD device or system, the user computing device may obtain parameters associated with the SD device and utilize the parameters to identify the SD device. The user computing device may obtain a privacy information removal file comprising an instruction set associated with removing privacy data from the SD device, and may present the instruction set. The user computing device may obtain a user feedback experience. The user feedback experience may include a confirmation of removal of the privacy information from the at least one SD device, user comments, a voice recording, or an image, captured by a camera of the user computing device, of the at least one SD device.

19 Claims, 16 Drawing Sheets

(56) References Cited

U.S. PATENT DOCUMENTS

| | | | | |
|---|---|---|---|---|
| 10,915,638 | B2 | 2/2021 | Czaplewski et al. | |
| 10,956,586 | B2 | 3/2021 | Sadeh et al. | |
| 11,113,415 | B1 | 9/2021 | Amico | |
| 11,157,648 | B1 | 10/2021 | Amico | |
| 11,256,827 | B2 | 2/2022 | Amico | |
| 11,494,514 | B1 | 11/2022 | Amico | |
| 11,651,105 | B2 | 5/2023 | Amico | |
| 2004/0025053 | A1 | 2/2004 | Hayward | |
| 2004/0166812 | A1 | 8/2004 | Lumelsky | |
| 2004/0208372 | A1 * | 10/2004 | Boncyk | H04N 1/00068 707/E17.023 |
| 2005/0196016 | A1 | 9/2005 | Sato | |
| 2007/0124046 | A1 | 5/2007 | Ayoub | |
| 2010/0211770 | A1 | 8/2010 | Alrabady | |
| 2010/0291880 | A1 | 11/2010 | Feldstein | |
| 2012/0263388 | A1 * | 10/2012 | Vaddadi | G06F 16/583 382/225 |
| 2012/0311717 | A1 * | 12/2012 | McCarty | G06Q 10/08 726/26 |
| 2013/0017816 | A1 | 1/2013 | Taity | |
| 2013/0060820 | A1 | 3/2013 | Bulusu | |
| 2014/0069999 | A1 * | 3/2014 | Sanford | G06K 19/06103 235/487 |
| 2014/0101784 | A1 | 4/2014 | Shukla | |
| 2014/0134947 | A1 | 5/2014 | Stouder-Studenmund | |
| 2014/0364099 | A1 * | 12/2014 | Pai | G06F 21/88 455/418 |
| 2015/0039738 | A1 | 2/2015 | Subramani | |
| 2015/0309754 | A1 * | 10/2015 | Smithwick | H02J 7/00 711/166 |
| 2015/0317484 | A1 | 11/2015 | Bowden | |
| 2016/0005986 | A1 | 1/2016 | Feit | |
| 2016/0034590 | A1 | 2/2016 | Endras | |
| 2016/0034712 | A1 | 2/2016 | Patton et al. | |
| 2016/0057790 | A1 | 2/2016 | Sim | |
| 2016/0128016 | A1 | 5/2016 | Avary | |
| 2016/0253348 | A1 | 9/2016 | Mau ti, Jr. | |
| 2017/0046533 | A1 | 2/2017 | Retter | |
| 2017/0127275 | A1 * | 5/2017 | Jones-McFadden | H04W 12/37 |
| 2017/0132157 | A1 | 5/2017 | Makke | |
| 2018/0302762 | A1 | 10/2018 | Dowlatkhah et al. | |
| 2019/0274018 | A1 | 9/2019 | Mosenia et al. | |
| 2020/0039525 | A1 | 2/2020 | Hu | |
| 2020/0092291 | A1 * | 3/2020 | Vempati | H04L 63/102 |
| 2020/0098049 | A1 | 3/2020 | Jack | |
| 2020/0169564 | A1 | 5/2020 | Tanriover et al. | |
| 2020/0285761 | A1 | 9/2020 | Buck et al. | |
| 2020/0334928 | A1 | 10/2020 | Bourke et al. | |
| 2021/0182402 | A1 | 6/2021 | Balu | |
| 2021/0303705 | A1 | 9/2021 | Serdar et al. | |
| 2022/0027506 | A1 | 1/2022 | Amico | |
| 2022/0058424 | A1 | 2/2022 | Amico | |
| 2022/0198054 | A1 | 6/2022 | Picos | |
| 2022/0405418 | A1 | 12/2022 | Amico | |
| 2023/0214521 | A1 | 7/2023 | Amico | |
| 2023/0214604 | A1 | 7/2023 | Amico | |
| 2023/0244814 | A1 | 8/2023 | Amico | |

* cited by examiner

504

DATA PRIVACY AND SECURITY IN SMART DEVICES

CROSS REFERENCE TO RELATED APPLICATIONS

This application is a continuation-in-part of and claims priority to U.S. application Ser. No. 17/967,349 titled "Data Privacy and Security in Vehicles," and filed on Oct. 17, 2022; which is a continuation of and claims priority to U.S. application Ser. No. 17/829,675 titled "Data Privacy and Security in Vehicles," and filed on Jun. 1, 2022; which is a continuation-in-part of and claims priority to U.S. application Ser. No. 17/500,002 titled "Data Privacy and Security in Vehicles," and filed on Oct. 13, 2021, which is a continuation of and claims priority to U.S. application Ser. No. 16/279,389 titled "Data Privacy and Security in Vehicles," and filed on Feb. 19, 2019, which claims benefit of U.S. Provisional Application No. 62/632,707 titled "Data Privacy and Security in Vehicles," and filed on Feb. 20, 2018, the entire contents for each of which are incorporated herein by reference.

TECHNICAL FIELD

Embodiments of the present disclosure relate generally to information security, and more particularly to data privacy and security in vehicles and other Smart Device products.

BACKGROUND

Smart Device products, including, but not limited to, smartphones, smart home devices, wearable technology, modern vehicles, and others, can store personally identifiable information of an owner or a user. These devices are also known as or defined as Internet of Things devices or "terminal equipment" devices (e.g., in specific laws, such as the European Union's ePrivacy Law). For example, modern vehicles include advanced in-vehicle systems, such as, infotainment, digital, and/or electronic systems, which can store personally identifiable information of an owner or a user. For example, a garage door opener of the owner or the user of a vehicle may be paired with a garage door system of the vehicle. The vehicle may store and retain data associated with opening the garage of the owner or the user (hereinafter both the owner and the user may be referred to as a 'user') for convenience and future use. In another example, an infotainment system of the vehicle, e.g., infotainment systems with Bluetooth pairing and/or navigation capability may store personal addresses, user contacts, phone numbers, financial information, points of interests, navigation data, home address, and/or other personal information associated with the users of the vehicle. Further, with several Internet connected vehicles, vehicles come equipped with telematics units and may offer companion mobile apps, which allow mobile users a number of advanced functions, such as locating and tracking the vehicle, locking and unlocking doors, remotely start or stop the engine, etc. In addition, in the future vehicles may monitor and record various other personal data of the user such as eye movements, pulse, unique voice signatures, video and audio inside and outside the vehicle, etc.

In other examples, smart home devices, such as a smart thermostat or refrigerator, may store personally identifiable information of a user, such as location information, how often one or more settings are utilized, and other various kinds of information, and may have access to other information via companion mobile applications associated with a user's computing device.

Due to the sensitive nature of this information, the user may desire to erase the information on the Smart Device product or system. For example, before a car associated with a user is handed over to the next user/buyer, such as, when a user sells his car, or a user returns a rental car to prevent unauthorized access of the sensitive information, the user may desire to erase such information. However, the sequence of steps required to erase such sensitive information of the user from the vehicle may not be readily available to the user. Typically, the sequence of steps required to erase the sensitive information of the user from the vehicle are included in the owner's manual that is associated with the vehicle. However, said sequence of steps may be spread over hundreds of pages and over multiple sections within the owner's manual. Finding the required steps from the hundreds of pages and multiple sections may be time intensive and inconvenient to the user. Further, the required steps that are included in the owner's manual may not be intuitive and easy to follow. Occasionally, the steps indicated in the manual may not be fully accurate or may be entirely missing. Vehicles may not have a user manual available in the vehicle, as is not uncommon with used vehicles and is customary with rental vehicles. In some cases, the user may not even remember or realize that such sensitive information of the user is stored in the vehicle. Furthermore, since there is a huge range of vehicle makes and models in the market, the sequence of steps required to erase the sensitive data is different for each make, model, model year, and trim/infotainment package. Additionally, the makes and models of the vehicles are constantly changing, e.g., new ones get added and old ones get updated all the time. Therefore, it may be very difficult and impractical for the dealers and car rental companies to provide steps required for erasing the instructions to the users (or employees) for all make and models; and to keep up with the different changes in the makes, models, trims, etc., of the vehicles.

Therefore, there exists a need for a technical solution to the technical problem of lack of information security (cybersecurity), lack of protection of consumers' privacy and personal information from unauthorized access, and increased information safety risks in Smart Device products. There exists a need for technology that allows sensitive or personal information of users to be erased from Smart Device products and systems to mitigate the risks associated with the breach of privacy information of the users.

This background information is provided to reveal information believed to be of possible relevance to the present disclosure. No admission is necessarily intended, nor should be construed, that any of the preceding information constitutes prior art against the present disclosure.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
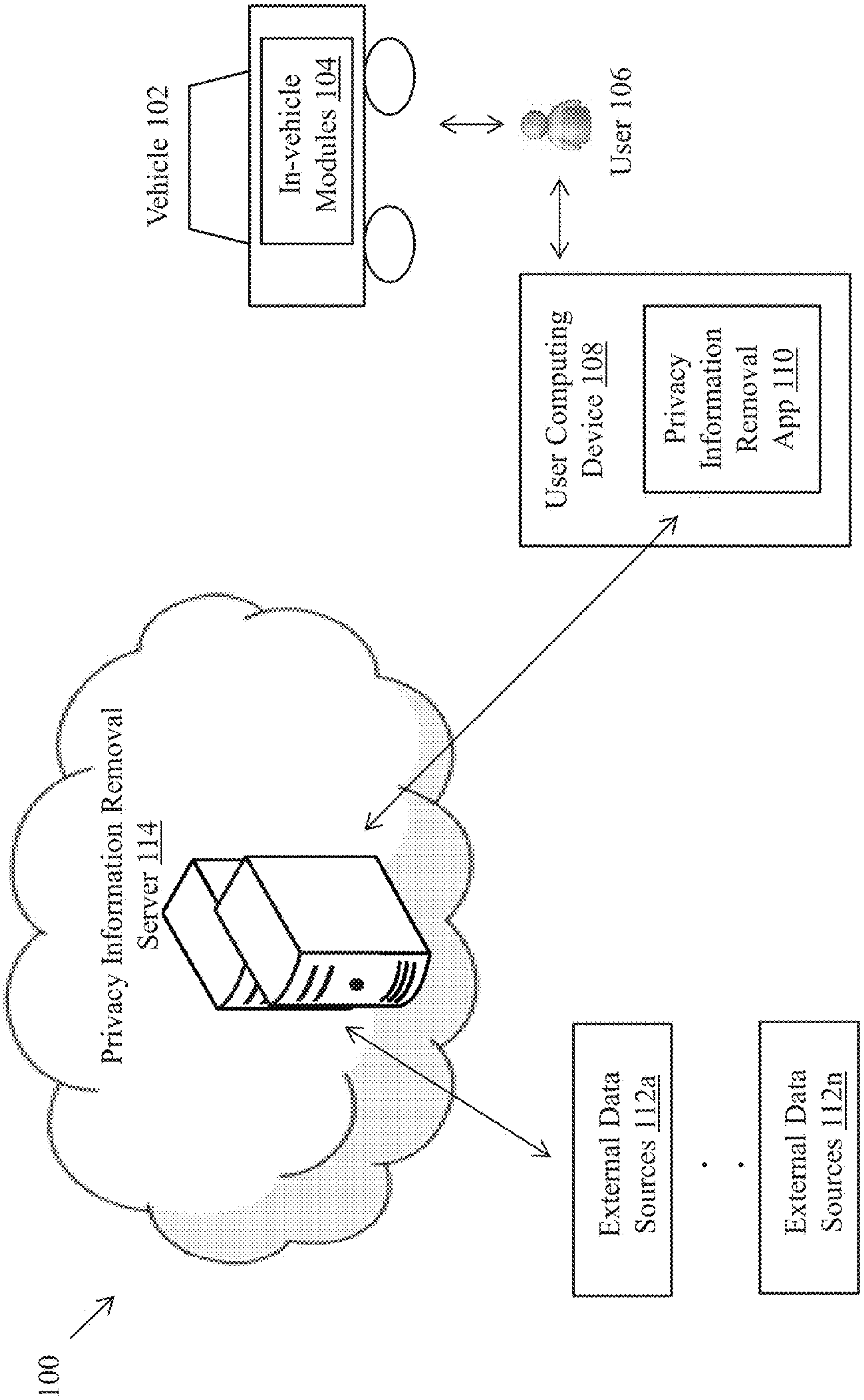
FIG. 1 illustrates an example system architecture of data security and privacy in vehicles, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a privacy information removal system and method that provides a technical solution to a technical problem of information security and privacy data protection in Smart Devices ("SD") products and systems, and particularly preventing unauthorized access of privacy data stored in such SD devices and systems, for example, smart home devices, wearable technologies, medical devices, in-vehicle modules of vehicles such as, infotainment modules, Bluetooth modules, garage door opener modules, telematics package, aftermarket telematics and GPS, etc. Further, the privacy information removal system and method of the present disclosure is configured to provide a practical application that allows a user to easily and consistently erase sensitive and personal information of the user or another associated user from any appropriate SD device or system by resetting the SD device or system that stores sensitive and personal information of the user or another user, thereby protecting consumers' privacy and personal information stored in such SD device or system. The privacy information removal system and method may also allow a user to activate or disable certain data privacy features, such as location services and connected services utilized in certain SD devices or systems, and also may allow a user to activate or disable access of other users to the SD device or system In particular, the privacy information removal system and method of the present disclosure provides a single comprehensive and integrated platform where information needed to reset any appropriate SD device or system can be obtained via a user-friendly search and said information is presented with easy to follow visual instructions and/or visual cues/indicators (or auditory, tactile, etc.). In some example embodiments, said information may be presented as voice instructions. An example aspect of the privacy information removal system and method includes a backend server with a database that includes data associated with erasing sensitive and personal information (herein 'privacy information') of a user from various SD devices and systems of various makes and models. The database may be built by collecting data associated with erasing the privacy information from SD devices and systems from multiple external data sources, such as, but not limited to, SD devices and systems manuals, owner's manuals of the vehicles, infotainment-specific manuals, manufacturer websites and data stores, third party websites that provide such information, video sharing websites, in-person inspections of vehicles, tier 1/2/3/suppliers to the OEMs, etc. The data that is collected from the multiple external data sources is processed and/or restructured/transformed by the backend server into concise instruction sets. In one embodiment, each instruction of each instruction set may have a corresponding image and/or a visual indicator (e.g., call outs), i.e., the concise instruction sets may include text instructions along with the images corresponding to the text instructions with or without indicators (visual, auditory, etc.) overlaid on or associated with the images. In some examples, the instruction sets may not include the images. Instead, the instruction sets may include the text instructions, indicators, and the data regarding where the indicators must be positioned on an image of the SD device or system (e.g., augmented reality-when instructions are presented on a live feed of the in-vehicle module). The indicators may be used to indicate a sequence of the instructions and a portion of the SD device or system (e.g., button, touch screen, knob, etc.) that a user should interact with to complete the instruction. The concise instruction sets for erasing the privacy information of a user from various SD devices and systems, including smart home devices, wearable devices, medical devices, and in-vehicle modules of various makes, models, and/or trims of vehicles may be stored in the database.

Further, the privacy information removal system and method include a front-end application that is available at a computing device of the user. The front-end application allows the user to provide an input comprising information associated with the SD device or system from which privacy information of a user is to be removed. In several embodiments, information associated with an SD device or system may include, but is not limited to, information identifying a category of the SD device or system (e.g., a SmartTV, a smartwatch, etc.), and/or a make and/or model of the SD device or system, and an input for such information may include a manufacturer model number, the name of the SD device or system, the name of the manufacturer of the SD device or system, a QR code, a bar code, an image of the SD device or system, a selection by the user in a drop-down menu provided by the front-end application of the SD device or system, or other features of the SD device or system. In some embodiments, the user may provide an input regarding the category of the SD device or system, or the system may recognize which category a SD device is in from the input without the user explicitly choosing a category or providing an input for a category. In certain embodiments, the information regarding the category of the SD device may be utilized by the backend server in identifying the SD device. For example, the system may receive an image of a Samsung smart television as an input, and the system may, in processing the image, categorize the SD device as a television for purposes of identifying the SD device. In another example, a user 106 may scan a bar code associated with a VIN number, and the system 100 may recognize the input as related to vehicles (i.e., the category) and return the make and model of the vehicle along with instructions for removing privacy information.

In another example, within the "vehicle" category, the front-end application may allow the user to provide an input comprising information associated with a vehicle (also interchangeably referred to as 'target vehicle') that includes the in-vehicle module (also interchangeably referred to as 'target in-vehicle module') from which a privacy information of a user is to be removed. Example information associated with the vehicle may include, but is not limited to, information that identifies the make, model, and/or trim of the vehicle. In one example, the input may include a vehicle identification number (VIN), a bar code or QR code representative of the VIN number, images of the dashboard, images of the infotainment system, live feed of the infotainment system as received by an image capture unit/device of the computing device, or other features of the vehicle that may be used to identify the specific in-vehicle module that may contain (or have stored therein) personal information that a user wishes to erase. In another example, the input may include the make, model, and trim of the vehicle that is selected by the user from a drop-down menu provided by the front-end application.

In either case, the input is transmitted to the backend server that processes the input to determine parameters associated with the SD device or system, and thereby identify the SD device or system. The parameters of the SD device or system may include, but are not limited to, SD category, manufacturer, make, model, and/or year of the SD device or system. In at least one embodiment, the backend server may query a database for and retrieves data associated with erasing the privacy information of a user from the SD device or system. The data associated with erasing privacy information from the SD device or system may include at least one instruction set that comprise the textual instructions, visual instructions, audio instructions, or other indications for removing privacy information from the SD device or system. The backend server transmits the data associated with erasing the privacy information of the user from the SD device or system to the computing device on which the front-end application is installed. After the front-end application receives the data associated with erasing the privacy information from the SD device or system, detailed step by step instructions are displayed with or without images of the SD device or system and/or indicators overlaid thereon so the user can confidently erase the privacy information from the SD device or system. The user may follow the instructions to erase the privacy information from the SD device or system. The front-end application may thereafter prompt the user to provide a user feedback, to determine whether the user was able to successfully erase the privacy information from the SD device or system using the instruction set. The feedback received may be in the form of comments, selections to prompts, images of the SD device or system, a voice recording, and/or the pressing of a button to submit or confirm the end of the data clearing process after the privacy information is removed.

Continuing with the example of a vehicle, the backend server processes the input to determine the vehicle parameters associated with the vehicle, and thereby identifies the vehicle. The vehicle parameters may include, but are not limited to, make, model, year, and/or trim of the vehicle. Based on the identified vehicle, i.e., the make, model, year, and/or trim of the vehicle, the backend server queries the database for and retrieves data associated with erasing the privacy information of the user from a set of in-vehicle modules (also interchangeably referred to as 'candidate in-vehicle modules'). The set of in-vehicle modules may include the target in-vehicle module, an in-vehicle module of a vehicle matching the identified make, model, year, and/or trim of the target vehicle; and/or in-vehicle modules of other vehicles that most-likely match or are related to the identified make, model, year, and/or trim of the target vehicle. In other words, the backend server retrieves instruction sets associated with erasing the privacy information from all in-vehicle modules that resemble the in-vehicle module of the vehicle of the identified make, model, year, and/or trim. In some examples, the backend server may be configured to retrieve data associated with erasing the privacy information of the user from in-vehicle modules of other vehicles that most-likely match or are related to the vehicle of the identified make, model, year, and/or trim only if the data associated with erasing the privacy information of the user from the target in-vehicle module of the target vehicle is unavailable in the database. The data associated with erasing the privacy information of the user from a set of in-vehicle modules may include the instruction sets that comprise the textual instructions, images of the in-vehicle modules, indicators, etc.

Further, the backend server may arrange the data associated with erasing the privacy information of the user from a set of candidate in-vehicle modules based on a likely order of resemblance of the candidate in-vehicle modules with the target in-vehicle module. The backend server may determine the likely order of resemblance based on one or more of the vehicle parameters of the target vehicle such as, but not limited to, the make, the model, the year, the trim, etc. For example, a candidate in-vehicle module of a vehicle that matches the make, model, year, and/or trim of the target vehicle may be arranged first in the likely order of resemblance (e.g., one that most resembles the target in-vehicle module of the target vehicle). Then, candidate in-vehicle modules of vehicles having the same make and model as the target vehicle, but a different year may be positioned as second in the likely order of resemblance (e.g., next most likely one to resemble the in-vehicle module of the vehicle), followed by in-vehicle modules of vehicles having the same make and model year of the target vehicle, but different model, and so on. The example likely order of resemblance of the in-vehicle modules described above is not limiting, and one of skill in the art can understand and appreciate that in other example embodiments, the likely order or resemblance may follow a different order based on a different criterion without departing from a broader scope of the present disclosure.

In the general case of a SD device or system, for some categories or modules, the likely order of resemblance may yield the choice of just one or few generic systems if that SD device or system or modules have a high level of standardization. For instance, in the case of vehicles, Original Equipment Manufacturers' (OEMs') garage door openers often adopt the HomeLink standard. In that case, a generic set of instructions for that standardized system may be presented. In another example, aftermarket OBD2 plug-in devices exist across many makes and models with often different capabilities and procedures to delete locally stored information, however, the system may provide a universal and standardized set of steps (e.g. on locating, identifying, and removing an OBD2 port device) because once unplugged power is lost and the device can simply be destroyed, refurbished, or recycled). In yet another example, for smartphones, there are two main operating systems (iOS and Android) and a handful of alternatives (e.g., WindowsCE); in that case generic instructions for a range of firmware versions, regardless of the actual make and model of the device may be sufficient.

Further, in some example embodiments, the backend server may determine the likely order of resemblance based on one or more of the vehicle parameter and/or other additional factors such as, but not limited to, user rating of the instruction set associated with the in-vehicle module of the vehicle, historical heuristics, version or body type of in-vehicle module, geography or location of vehicle, version and make of the in-vehicle module, etc.

In either case, the backend server transmits the data associated with erasing the privacy information of the user from the set of candidate in-vehicle modules to the computing device on which the front-end application is installed. Then, the front-end application presents, via the computing device, a series of images of the set of candidate in-vehicle modules based on the likely order of resemblance. In other words, the front-end application presents a series of images of candidate in-vehicle modules that exactly match and/or most-likely match the target in-vehicle module installed in the target vehicle from which the user desires to erase privacy information. Once the user selects one of the presented images of the candidate in-vehicle modules, detailed step by step instructions are displayed with or without images of the candidate in-vehicle module and/or indicators overlaid thereon so the user can confidently erase the privacy information. If a target vehicle has more than one in-vehicle module associated with it (e.g., an infotainment module and a garage-door module), or has an in-vehicle module that includes one or more submodules (e.g., an infotainment module may include a navigation submodule and a Bluetooth submodule), the front-end application may present a representative image of the candidate in-vehicle modules and/or submodules, or some other identifier (e.g. a part number, a model name or code) for the user to select from, and once the user makes a selection, detailed step by step instructions may be displayed for each of the in-vehicle modules and/or submodules (either in a continuous list or in sequential displays) so that the user can erase the privacy information from the more than one in-vehicle modules and/or submodules. The user can follow the instructions associated with the selected candidate in-vehicle module or submodule (e.g., candidate in-vehicle module that bears closest resemblance to or exactly matches the target in-vehicle) to erase the privacy information from the target in-vehicle modules of the target vehicle. In an alternative embodiment, once the user selects one of the presented images of the candidate in-vehicle modules, the front-end application may then present a menu to the user for selecting one or more procedures to erase the privacy information from the selected module or submodule in the target vehicle. For example, if the target vehicle has three in-vehicle modules and/or submodules that the user can erase privacy information from (e.g., an infotainment module having a navigation submodule and a Bluetooth submodule, and a garage door module), after the user selects one of the presented images of the candidate in-vehicle module installed in the target vehicle, the front-end application may then present to the user an image or representative figure of each of the three in-vehicle modules and submodules. Continuing with the example, once the user selects one of the three in-vehicle modules and submodules to remove the privacy information from, detailed step by step instructions are displayed so that the user can erase the privacy information from the selected in-vehicle module or submodule. After the user has erased the privacy information from the selected in-vehicle module, the front-end application may present the in-vehicle module and submodule selection again, so that the user may select another in-vehicle module or submodule to receive instructions for removing the privacy information from.

Further, the front-end application may prompt the user to provide feedback on the quality of the experience, for example: (a) whether the displayed images of the candidate in-vehicle modules matched the actual target in-vehicle module of the vehicle, (b) whether the user was able to successfully erase the privacy information from the various target in-vehicle modules using the instruction set, and/or (c) whether the user's target in-vehicle module was included as part of the available instruction set(s). The feedback received may be in the form of comments, selections to prompts, images of the in-vehicle module, a voice recording, and/or the pressing of a button to submit or confirm the end of the data clearing process after the privacy information is removed. For example, after the user has received the step by step instructions for removing privacy information from the in-vehicle module or submodule, the front-end application may present a prompt to the user that asks the user to confirm whether the user successfully removed the privacy information, and after confirmation that the user was successful, the front-end application may present a comment box so that the user can write and upload comments. In another embodiment, after the user has received the step by step instructions for removing privacy information from the in-vehicle module or submodule, the front-end application may launch an in-application camera function that allows the user to capture and upload an image of the in-vehicle module that the user just erased privacy information from. If the displayed images do not match the actual target in-vehicle module of the target vehicle and/or the user was not able to successfully erase the privacy information by following the instruction set, the front-end application further allows the user to provide comments, one or more images of the in-vehicle module, and/or may provide the user with alternate instruction sets. The feedback and comments provided by the user are transmitted to the backend server to be logged for further analysis and/or reworking of the existing instruction sets. Furthermore, the front-end application may prompt the user to rate privacy information protection features and design of the specific make, model, year, and/or trim of the vehicle which can then be used by other users to determine a data security and privacy standard of vehicles of the same make, model, and/or trim, for example, when the other users are planning to sell a vehicle.

The privacy information removal system and methods thereof disclosed herein may be utilized for any SD device or system that stores personally identifiable information of one or more users, such as, but not limited to, smart home technologies, wearable devices, medical devices, modern vehicles, and other smart devices. Though the examples disclosed herein primarily discuss in-vehicle modules of vehicles, the disclosed privacy information removal system and methods thereof may be utilized with any SD device or system, and is not limited to in-vehicle modules of vehicles.

Before discussing the example embodiments directed to the privacy information removal system and method as utilized with in-vehicle modules of vehicles, it may assist the reader to understand the various terms used herein by way of a general description of the terms in the following paragraphs.

The term 'privacy information' as used herein may generally refer to any information stored in a vehicle that a user does not want an unauthorized party to access. Privacy information may include, personal or user specific information corresponding to the user that is stored in an in-vehicle module, such as, Bluetooth module, navigation module, garage door opener module, toll road pass module, etc. For example, the privacy information may include the home and/or business address for the user and a contact list of individual names, addresses, phone numbers, passwords, etc. Privacy information may further include navigational data, such as locations that the user drives to and from (e.g., a home or business or other points of interest). Privacy information may also include financial information, such as a bank account number or credit card number, corresponding to the user of the vehicle. An appropriate in-vehicle module may utilize this financial information to pay fees (e.g., toll fees) associated with the operation of the vehicle or to make other payments.

The term 'in-vehicle module' may generally refer to any appropriate device of a vehicle that is integrated with or coupled to the vehicle and can store privacy information of a user therein. For example, the in-vehicle module may include garage door opening system of a vehicle, a telematics device, infotainment system, toll pass device, etc. The in-vehicle module may be interchangeably referred to as an in-vehicle device or in-vehicle unit without departing from a broader scope of the present disclosure.

The term 'likely order of resemblance' as used herein in the context of a likely order of resemblance of candidate in-vehicle modules with a target in-vehicle module may generally refer an order or ranking that identifies candidate in-vehicle modules that exactly and/or likely match a target in-vehicle module in any appropriate characteristics of the target in-vehicle module and/or the target vehicle associated with the target in-vehicle module. That is, the likely order of resemblance may indicate how closely a candidate in-vehicle module resembles the target in-vehicle module with respect to any appropriate characteristics of the target in-vehicle module and/or the target vehicle associated with the target in-vehicle module. For example, out of ten parameters, a candidate in-vehicle module that matches the target in-vehicle module in most parameters associated with the characteristics of the target in-vehicle module, such as version, manufacturer, looks, vehicle type in which it is installed, etc., may be listed highest in the order. The likely order of resemblance may be determined using an algorithm that factors in one or more vehicle parameters of a target vehicle that is associated with the target in-vehicle module (e.g., make, model, year, trim, body type, OEM group, geography, etc.) and/or one or more characteristics of the target in-vehicle module (e.g., manufacturer, hardware and software version, etc.)

Referring to FIG. 1, the privacy information removal system 100 may include a vehicle 102 having one or more in-vehicle modules 104 that may store privacy information of a user 106 when the user 106 uses the in-vehicle modules 104 for various operations, such as, making phone calls, getting navigation information, opening garage doors, etc. The vehicle 102 may include, but is not limited to, one of a number of different types of automobiles or motor vehicle, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD), hybrid vehicles, electric vehicles, motorcycles, commercial vehicles (trucks, vans, buses, etc.), recreational vehicles (RVs), all-terrain vehicles (ATVs), drivable industrial equipment (e.g. cranes, bulldozers, combines, agricultural tractors, drilling rigs, etc.), military vehicles (e.g. tanks, assault vehicles, amphibious vehicles, missile launchers, armored vehicles, mine detecting vehicles, etc.), boats, yachts, ships, planes, etc. Further, the user 106 may include either a private owner of the vehicle, other users who are related to and are authorized by the private owner to drive the vehicle (e.g., spouse, kids, friends, etc.,), an individual who leases or rents the vehicle from a dealership or a rental agency, an employee of the dealership or rental agency, or a third party service provider, such as an inspector, a claim adjustor, or a mechanic shop operator. In some example embodiments, the user 106 may be an entity, such as a rental agency, dealership, etc.

Further, the privacy information removal system 100 may include a user computing device 108 that is associated with the user 108. The user computing device 108 may be a portable computing device having display, user interaction, and/or network communication capabilities (e.g., Internet connectivity), such as, a mobile phone, a laptop, a tablet, a smart phone, any other appropriate hand-held device, etc. In some example embodiments, the user computing device 108 may also include a desktop or a computing system in-built in the vehicle that has a display, user interaction, and/or network communication capabilities. In said some example embodiments, the user computing device 108 may be disposed in and/or integrated with the vehicle.

As illustrated in FIG. 1, the user computing device 108 may include a privacy information removal application 110 (e.g., front end application) that the user 106 can use to receive instruction sets associated with erasing the privacy information of the user 106 that is stored in in-vehicle modules 104 of the vehicle 102 by resetting the in-vehicle modules 104. In one example embodiment, the privacy information removal application 110 may be a stand-alone mobile application that the user 106 can download to the user computing device 108. In another example embodiment, the privacy information removal application 110 may be a software development kit (SDK) that may be embedded into an internal or external (third party) program code or application. For example, the privacy information removal application 110 may be embedded within an application of a rental agency. In yet another example embodiment, the features of the privacy information removal application 110 may be offered as a service via webservers and/or Application Programming Interfaces (APIs).

In particular, the privacy information removal application 110 may prompt the user 106 via the user computing device 108 to provide an input that identifies the vehicle 102 from which privacy information is to be removed. Responsive to receiving the input, the privacy information removal application 110 transmits the input to a privacy information removal server 114 via a network interface and radio assembly of the user computing device 108. The privacy information removal server 114 processes the input to determine vehicle parameters associated with the vehicle 102, e.g., the make, model, and/or trim of the vehicle. Further, based on the vehicle parameters (e.g., make, model, year, and/or trim), the privacy information removal server 114 queries a privacy information removal guide and images database 224 (shown in FIG. 2) (hereinafter 'privacy information removal database 224' or 'privacy database 224') to retrieve data associated with erasing the privacy information from a set of in-vehicle modules, where the set of in-vehicle modules include the in-vehicle module 104 of the vehicle 102 matching the identified make, model, year, and/or trim; and/or in-vehicle modules of other vehicles that most-likely match or are related to the vehicle 102 of the identified make, model, year, and/or trim.

The privacy information removal database 224 may be built by collecting data associated with erasing the privacy information in a vehicle from multiple external data sources 112*a-n*, such as, owner's manuals of the vehicles, infotainment-specific manuals, manufacturer websites and data stores, third party websites that provide vehicle information, video sharing websites, etc.

Once the data is retrieved, the privacy information removal server 114 transmits the data to the user computing device 108 which displays the images of the set of in-vehicle modules in a likely order of resemblance of each in-vehicle module of the set of in-vehicle modules with the in-vehicle module 104 of the vehicle 102. The user 106 may select an image of one of the in-vehicle modules of set of in-vehicle modules that either exactly matches the in-vehicle module 104 of the vehicle 102 or most closely resembles the in-vehicle module 104 of the vehicle 102. Responsively, the computing device 108 may present an instruction set associated with erasing the privacy information of the user 106 from the selected in-vehicle module. In an alternative embodiment, if the privacy information removal server 114 only transmits data for one instruction set (because there is only one in-vehicle module associated with the target vehicle 102), then the computing device 108 may automatically display the instruction set associated with erasing the privacy information of the user from the one in-vehicle module 104 of the vehicle 102, bypassing the user selection step. The user 106 may use the instruction set to erase the privacy information of the user 106 from the in-vehicle module 104 of the vehicle 102. Further, the privacy information removal application 110 prompts the user 106 to provide feedback on whether the user 106 was able to follow the instruction set and successfully erase the privacy information from the vehicle 102. The feedback may include comments provided by the user 106 and/or images uploaded by the user 106 (e.g., by accessing the image capture functionality of the computing device 108 or otherwise allowing uploads of images from the computing device 108), a voice recording, and/or the pressing of a button to submit or confirm the end of the privacy information removal process. For example, the privacy information removal application 110 may prompt the user to provide an image of the in-vehicle module 104 after successfully removing the privacy information from the in-vehicle module 104 to the privacy information removal application 110. If the user 106 was unable to successfully erase the privacy information from the vehicle 102 or if the images of none of the in-vehicle modules in the set of in-vehicle modules matched the actual in-vehicle module 104 of the vehicle 102, then, the privacy information removal application 110 may further prompt the user 106 to provide additional feedback, one or more images, voice recordings, and/or comments. Responsively, the feedback and comments provided by the user 106 may be transmitted to the privacy information removal server 114 where they are stored for further analysis, reworking of the instruction set, and/or to provide alternate instruction set. In one embodiment, if the user 106 was unable to successfully erase the privacy information from the vehicle 102 or if the images of none of the in-vehicle modules in the set of in-vehicle modules matched the actual in-vehicle module 104 of the vehicle 102, then, the privacy information removal application 110 may display a series of standard questions regarding the non-removal of the privacy information, and the user may provide one or more images, comments, voice recordings, or other feedback to each question in the series of standard questions in response. Furthermore, the privacy information removal application 110 may prompt the user 106 to rate the privacy information protection features and design of the specific make, model, and/or trim of the vehicle. The rating will be stored in a user experience database 226 (shown in FIG. 2) by the privacy information removal server 114. Additionally, the privacy information removal server 114 handles user registration, billing, instruction set usage tracking, user experience, etc.

In one example, the privacy information removal server 114 may be hosted on a cloud platform. However, in other examples, the privacy information removal server 114 may be hosted on a software as a service (SaaS) platform, or on a dedicated server in a data center without departing from a broader scope of the present disclosure.

Figure 2:
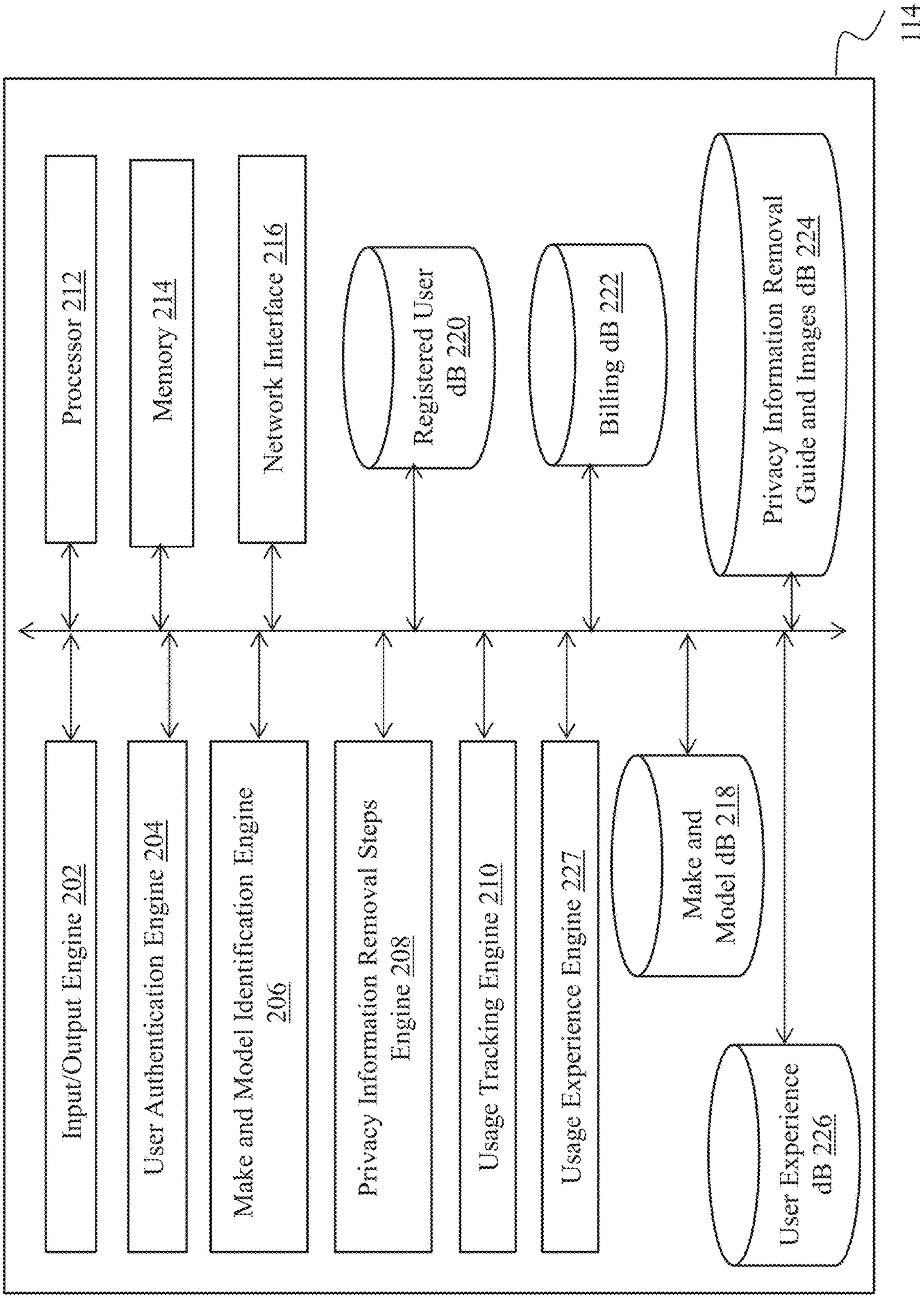
FIG. 2 illustrates an example block diagram of the privacy data removal engine, in accordance with example embodiments of the present disclosure.
Figure 3:
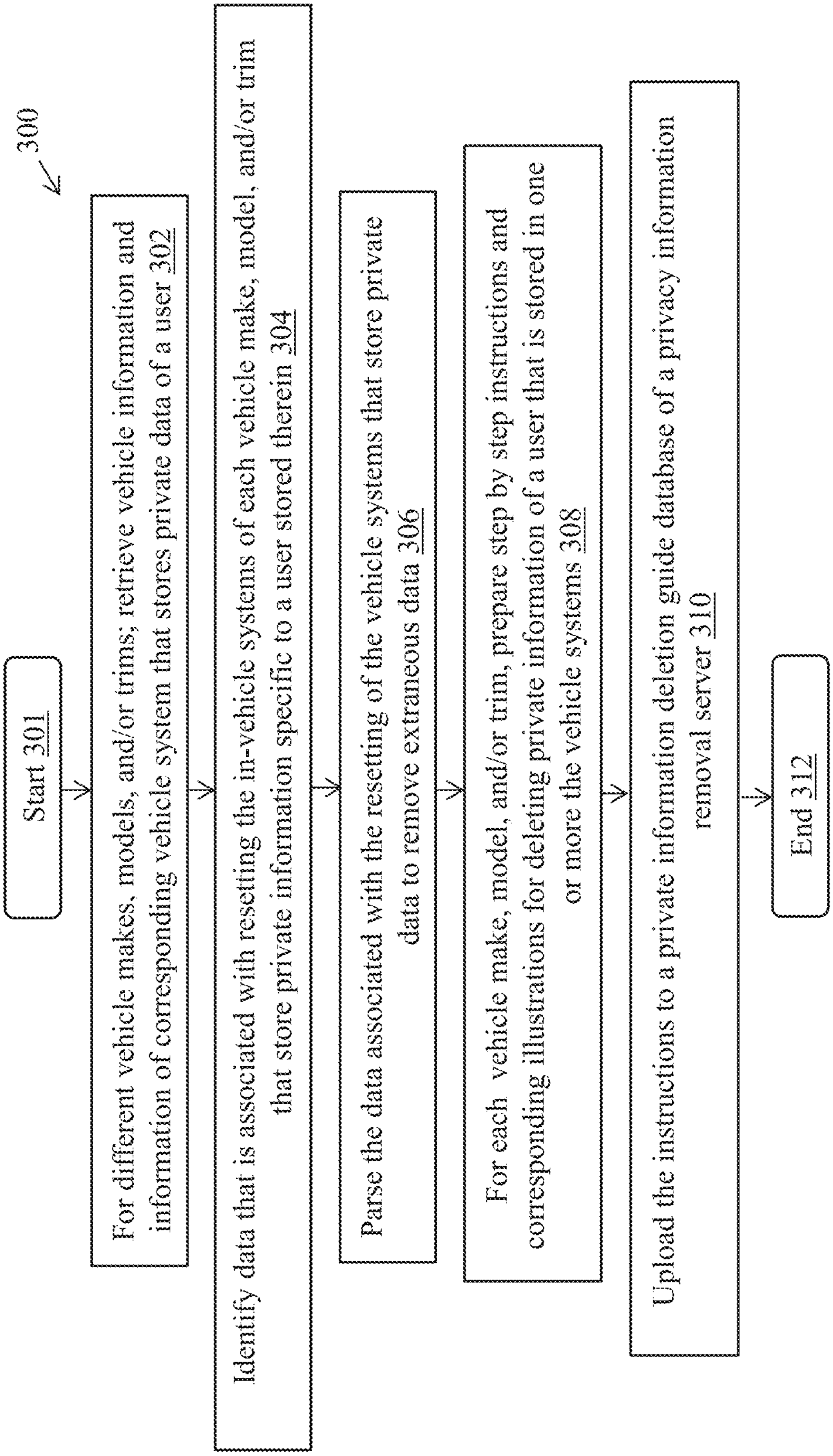
FIG. 3 is a flowchart that illustrates an example method of building the privacy data removal database, in accordance with example embodiments of the present disclosure.
Figure 4A:
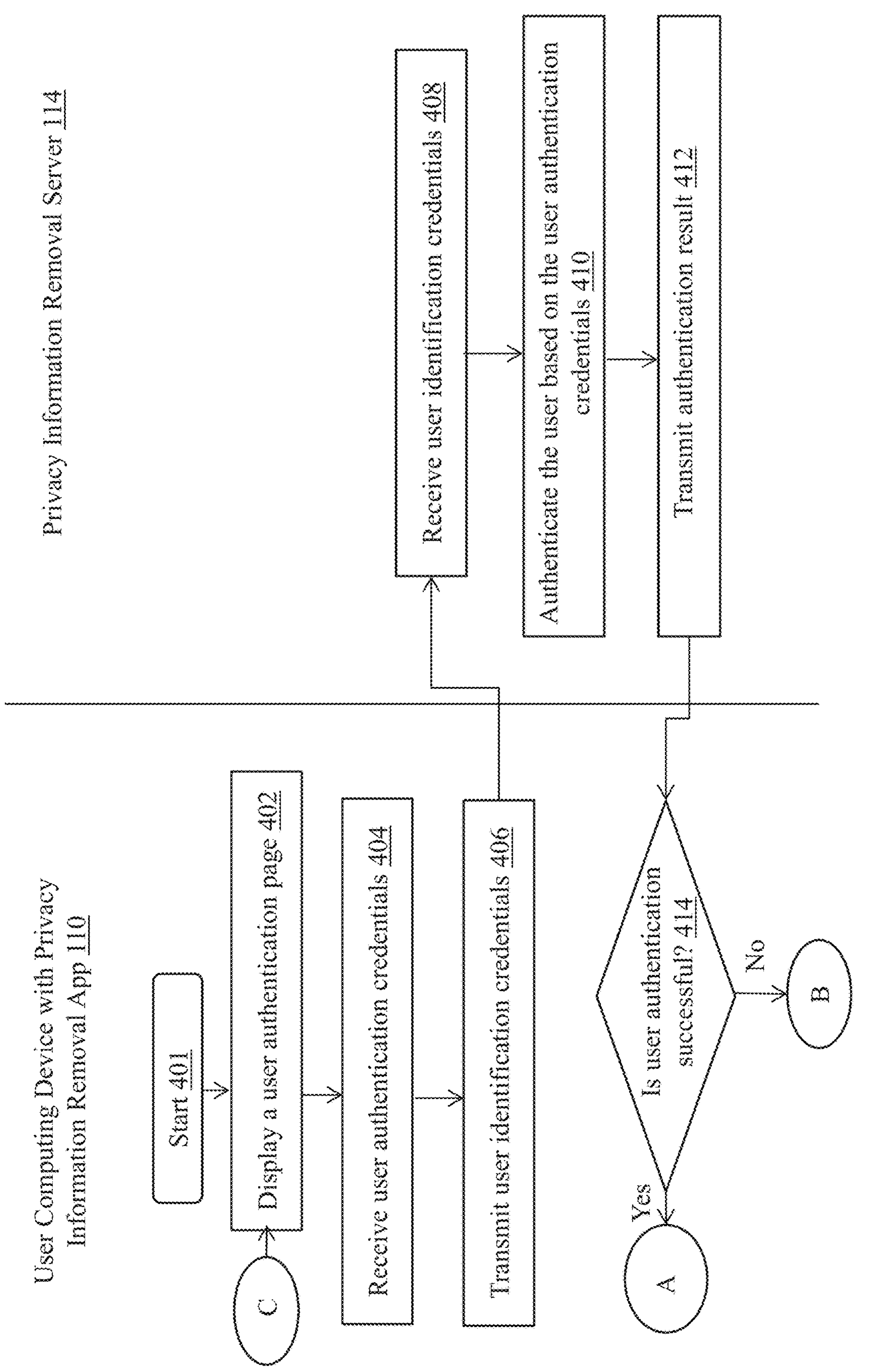
FIGS. 4A-4D (collectively 'FIG. 4') are flowcharts that illustrate an example method of removing a user's private data from one of more systems of a vehicle, in accordance with example embodiments of the present disclosure.
Figure 4B:
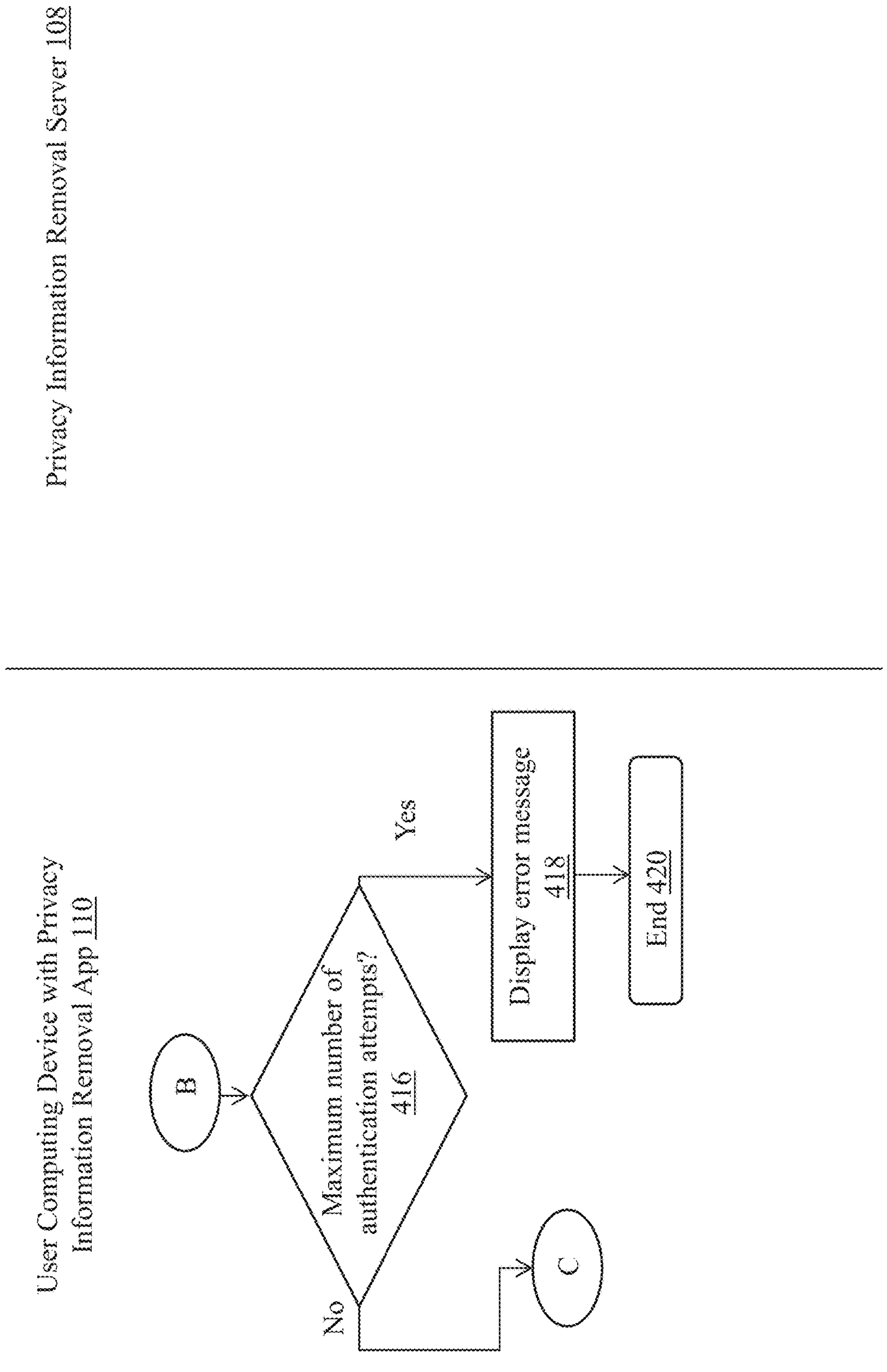
Figure 4C:
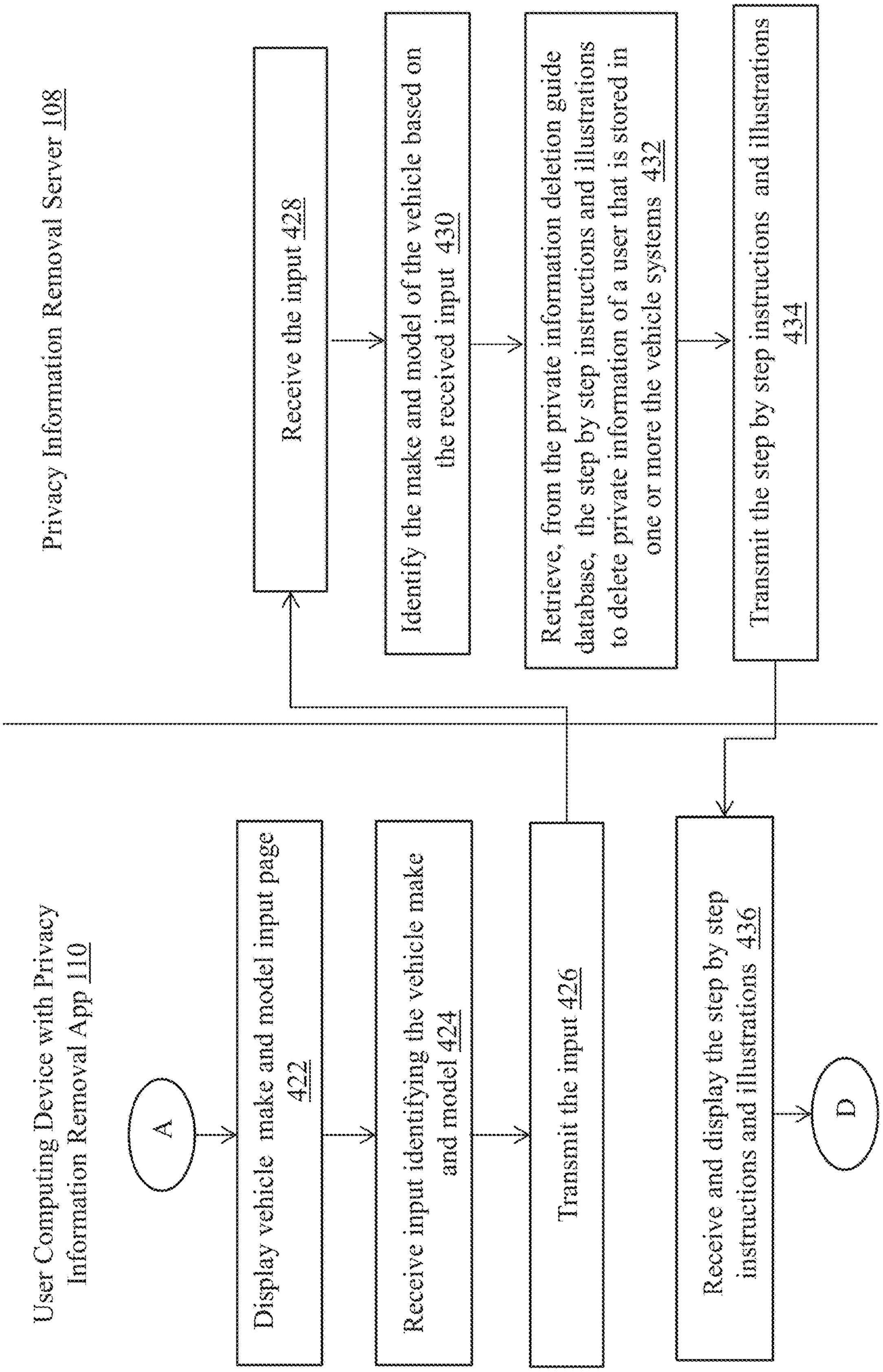
Figure 4D:
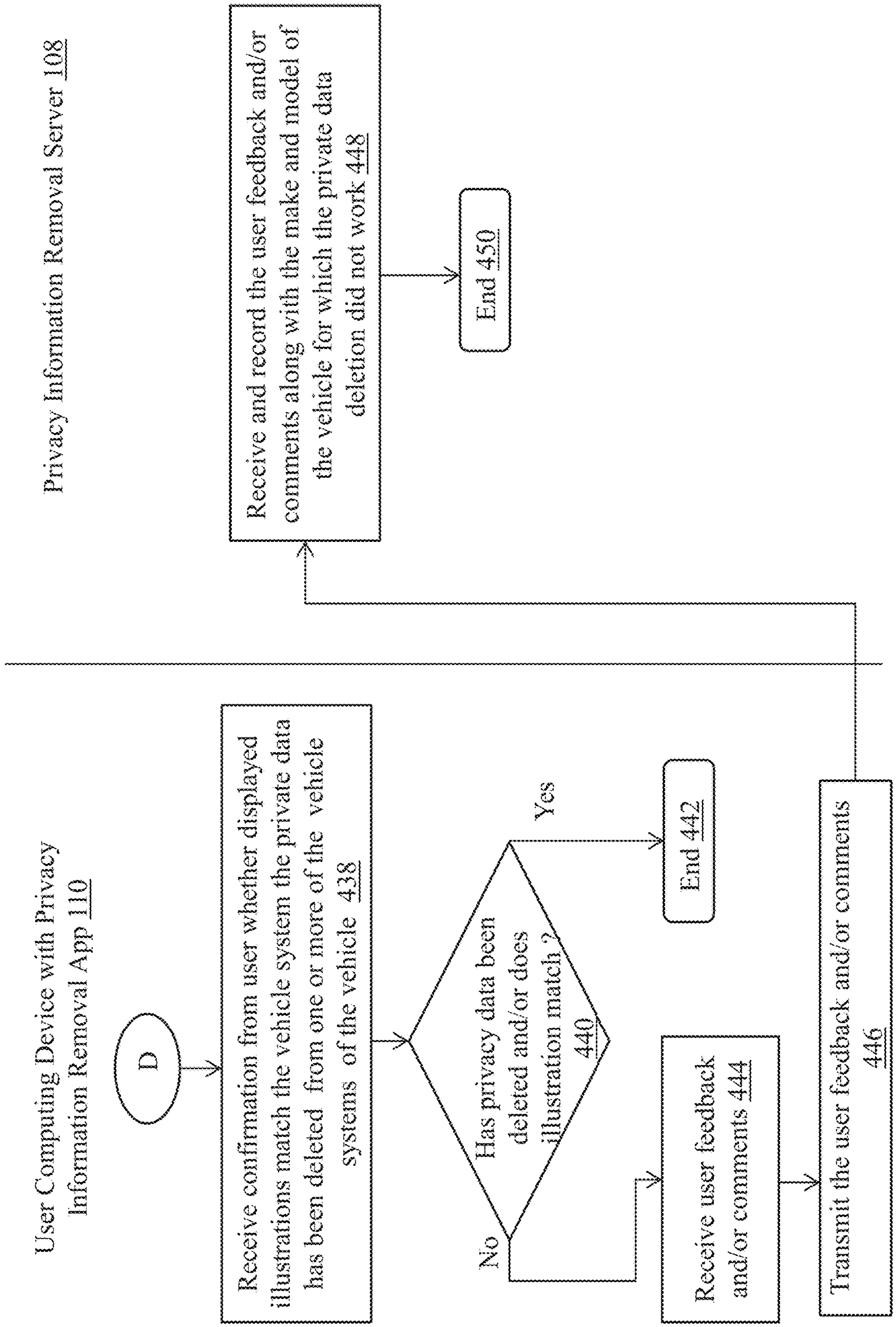

The operation of the privacy information removal system 100 will be described below in greater detail in association with FIGS. 3-4 and 6 by referring to FIGS. 2 and 5 which illustrates the various example components of the privacy information removal server 114. FIGS. 3-4 and 6 illustrate flowcharts associated with the operation of the privacy information removal system. Although specific operations are disclosed in the flowcharts illustrated in FIGS. 3-4 and 6, such operations are only non-limiting examples. That is, embodiments of the present invention are well suited to performing various other operations or variations of the operations recited in the flowcharts. It is appreciated that the operations in the flowcharts illustrated in FIGS. 3-4 and 6 may be performed in an order different than presented, and that not all of the operations in the flowcharts may be performed.

All, or a portion of, the embodiments described by the flowcharts illustrated in FIGS. 3-4 and 6 can be implemented using computer-readable and computer-executable instructions which reside, for example, in a memory of the user computing device 108 or the privacy information removal server 114. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Building the Privacy Information Removal Database

Referring to FIG. 3, the process 300 of building the privacy information removal database 224 of the privacy information removal server 114 begins at operation 301 and proceeds to operation 302 where, for various makes, models, years, and/or trims of vehicles, data regarding one or more in-vehicle modules of the vehicles that store the privacy information of users are retrieved from a plurality of external data sources 112*a-n*. The collected data may be stored in a make and model database 218 of the privacy information removal server 114. Responsive to retrieving data regarding the in-vehicle modules of vehicles of different makes, models, years, and/or trims, in operation 304 and 306, data associated with resetting the one or more in-vehicle modules is identified and said data is parsed to remove any extraneous information. Further, in operations 308 and 310, for each vehicle make, model, year, and/or trim, instruction sets comprising step by step instructions (textual instructions) and/or corresponding images are prepared and uploaded to the privacy information removal database 224 of the privacy information removal server 114 for erasing the privacy information of users stored in the one or more in-vehicle modules of the vehicles. In one or more examples, the images associated with each instruction may include indicators (visual, auditory, etc.) such as numbered callouts (shown in FIG. 5) that are configured to indicate both the order or sequence of operations and/or portions of the in-vehicle module that the user 106 needs to interact with in each instruction to erase the privacy information.

In one example embodiment, operations 302-310 may be manually performed, for example, by a system administrator via an administrator console (e.g., computing device) (not shown) that is communicatively coupled to the privacy information removal server 114. That is, the steps of retrieving data regarding the in-vehicle modules from the multiple external data sources 112, parsing the retrieved data, preparing the instruction sets, and uploading the instruction sets to the privacy information removal database 224 via the administrator console are performed manually by a system/database administrator. For example, the administrator may collect, via the administrator console, the "long form" instructions (e.g., from manuals or videos) and synthesize them in step-by-step instructions with images, add call-outs, and/or text instructions.

However, in other example embodiments, operations 302-310 may be automatically performed by the privacy information removal server 114. For example, in operation 302, the input/output engine 202 of the privacy information removal server 114 may retrieve data regarding the in-vehicle modules for different makes, models, years, and/or trims of vehicles from the multiple external data sources 112*a-n* using a push or a pull mechanism. In the pull mechanism, the input/output engine 202 of the privacy information removal server 114 may crawl through data stores of the multiple external data sources 112*a-n* to retrieve the relevant data associated with the in-vehicle modules of the different makes, models, and/or trims of vehicles. In the push mechanism, the multiple external data sources 112*a-n* may be configured to push or transmit said data to the input/output engine 202 of the privacy information removal server 114 either periodically or as and when new data is available. In either case, responsive to receiving or retrieving the data regarding the in-vehicle modules for different makes, models, and/or trims of vehicles, in operations 304-310, the processor 212 and the privacy information removal steps engine 208 of the privacy information removal server 114 may operate in concert to identify data associated with resetting the in-vehicle modules, parse the identified data, prepare the instruction set with the step by step instructions and corresponding images to erase the privacy information of the user from the one or more in-vehicle modules, and store the instruction set in the privacy information removal database 224. In other words, the collection and transformation of the collected data to concise, easy to follow, and relevant instruction set with or without images and indicators can be performed either manually by a system/database administrator and uploaded to a database or automatically by the privacy information removal server 114.

It is noted that the privacy information removal database 224 may be updated periodically or as and when changes are warranted. That is, a system administrator can access the privacy information removal database 224 via an administrator console that is communicatively coupled to the privacy information removal server 114 to create, modify, delete and maintain data entries in privacy information removal database 224 and/or the other databases (218-222, and 226) of the privacy information removal server 114. For example, when the system storing personal information for a specific make and model of a vehicle is updated (for instance, a new firmware is installed by the dealer or Over The Air ("OTA"), appropriate changes may be made to the data entry associated with the discontinued vehicle make and model in the privacy information removal database 224. In another example, when a new make and model of a vehicle enters the market, the system administrator may create a new data entry for the new vehicle make and model.

Furthermore, in the case of business-to-business models, the billing and tracking of the usage of the instruction sets may be based on the VIN of the vehicle. In a business-to-business model, such as when the privacy information removal system 100 is used by a rental agency, a Digital Right Management tool or the usage tracking engine 210 within the system will grant the VIN numbers of all or a plurality of the vehicles of the rental agency to be erased by users without usage limits. Additionally, in the business-to-business model involving the rental agency, when the rental agency sells a vehicle, the Digital Right Management or the usage tracking engine 210 would receive notification from the rental car company that the vehicle has been disposed from their fleet, and consequently the unlimited usage rights have expired.

In an alternative embodiment, the data privacy removal system 100 may utilize artificial intelligence, such as a Large Language Model, to generate instruction set(s) to the user 106 for removing the privacy information from the target in-vehicle module 104. For example, once the user 106 provides the input for the vehicle 102, the artificial intelligence model may utilize the input to generate the instruction set(s) for removing the privacy information. In certain embodiments, the artificial intelligence model may be trained using information associated with removing privacy information from the in-vehicle modules, such as owner's manuals of the vehicles, infotainment-specific manuals, manufacturer websites and data stores, third party websites that provide vehicle information, video sharing websites, etc. Thus, in one embodiment, after receiving the input at step 428, the artificial intelligence model generates the instruction set for removing the privacy information, rather than continuing to step 432 of retrieving the instruction set from the privacy database 224.

Erasing the Privacy Information of a User from in-Vehicle Modules of a Vehicle

Before discussing the FIGS. 4 and 6, it may assist the reader to understand that the in-vehicle module 104 from which privacy information of a user 106 is to be removed may be interchangeably referred to as a target in-vehicle module or actual in-vehicle module without departing from a broader scope of the present disclosure. Similarly, the vehicle 102 that is associated with the in-vehicle module 104 may be interchangeably referred to as a target vehicle without departing from a broader scope of the present disclosure. Further, the in-vehicle modules associated with the set of in-vehicle modules of vehicles that are related to the vehicle 102 (as described above in association with FIGS. 4 and 6) may be interchangeably referred to as candidate in-vehicle modules associated with the set of candidate in-vehicle modules, without departing from a broader scope of the present disclosure.

The term 'other vehicle that are related to the vehicle 102' or 'vehicles that are related to the vehicle 102' may refer to any appropriate vehicle that may be associated with the target vehicle 102 based on one or more parameters such as, but not limited to, a make, a model, a model year, an OEM group, a body type, a trim, etc., associated with the vehicle 102. For example, a vehicle having the same make, model, and model year, but having a trim level that is different from that of the vehicle 102 may be considered as a vehicle that is related to the vehicle 102. Similarly, in another example, a vehicle the belongs to the same OEM group but having a makes, models, and trim levels that is different from that of the vehicle 102 may be considered as a vehicle that is related to the vehicle 102.

Referring to FIG. 4, the process 400 of erasing the privacy information of the user 106 from one or more in-vehicle modules 104 of the vehicle 102 begins at operation 401 where the user 106 accesses the privacy information removal application 110 on the user computing device 108. As described above, the privacy information removal application 110 may be: (a) downloaded by the user 106 as a stand-alone application, (b) embedded in a third-party application that is downloaded on the user computing device 108, or (c) offered as a service via a web server or an API. In either case, when the user 106 opens the privacy information removal application 110, in operation 402, a user authentication page may be presented to the user 106 via a display of the user computing device 108. The user authentication page prompts the user 106 to provide user authentication credentials that the user may have created while registering with the privacy information removal system 100 to receive the services offered by the privacy information removal system 100. The user registration information may be stored in the registered user database 220 of the privacy information removal server 114 and may include, but is not limited to, user identification, user authentication credentials, financial data associated with the user for the purposes of billing, etc. Additionally, during registration, the user 106 may specify a billing plan of the user's choice. Example billing plans can include, but are not limited to, payment per use; payment per N uses; weekly, monthly, or yearly subscription; etc. Based on the user's choice of billing plan, the billing database 222 maps the user identification information of the registered user to the billing plan of the registered user's choice. Further, the billing database 222 is also configured to maintain a list of the available billing plans and track the billing details associated with each registered user 106 based on their choice of billing plan.

Alternatively, rather than registering and billing users, the usage tracking engine 210 may trigger billing based on the Digital Rights Management related to the scanned VIN (for instance, as in the example above, if a VIN belongs to a fleet what has purchased unlimited deletions, every time that VIN is scanned no billing will be triggered).

Referring to operation 402, responsive to displaying the user authentication page, in operations 404-406, the user computing device 108 receives user authentication credentials from the user 106 and transmits the user authentication credentials to the privacy information removal server 114. In operation 408, the input/output engine 202 of the privacy information removal server 114 receives the user authentication credentials of the user 106 from the user computing device 108 and forwards the user authentication credentials to the user authentication engine 204 of the privacy information removal server 114. In operation 410, the user authentication engine 204 operates in concert with the registered user database 220 to authenticate the user 106 based on the received user authentication credentials and the authentication credentials of the user 106 stored in the registered user database 220. Further, in operation 412, the user authentication engine 204 operates in concert with the input/output engine 202 to transmit the authentication result to the user computing device 108. In operation 414, upon receiving the authentication result and determining that the user authentication has been unsuccessful, in operations 416-420, the privacy information removal application 110 provides another authentication opportunity to the user 106, provided the maximum number of allowed authentication attempts have not been exhausted. If the maximum number of allowed authentication attempts have been exhausted, the privacy information removal application 110 may display an error message via a display of the user computing device 108 and ends the process 400. In some example embodiments, the user registration and authentication steps may be omitted.

However, in operation 414, upon determining that the user 106 has been successfully authenticated, in operation 422, the privacy information removal application 110 displays a vehicle make and model input page 501 (shown in FIG. 5) via a display of the user computing device 108. In some example embodiments, once the user 106 has been successfully authenticated and logged in, the user 106 may remain logged in till the user 106 expressly selects and option to log out. As such, if the user has not expressly logged out, the user 106 does not have to input or provide authentication credentials each time the user accesses the privacy information removal application 110.

The vehicle make and model input page 501 prompts the user 106 to provide a vehicle information that can be used to identify the vehicle 102. In particular, the vehicle information may be configured to determine vehicle parameters such as, but not limited to, the make, model, year, trim, and/or any other appropriate information associated with the vehicle 102. The vehicle parameters may be used to retrieve instruction sets associated with erasing privacy information of the user 106 from one or more in-vehicle modules 104 of the vehicle 102. The instruction sets may be retrieved from a privacy information removal database 224 of the privacy information removal server 114. In the example embodiment illustrated in FIG. 5, the vehicle information may include a manual selection of the make, model, and year that is selected from predefined dropdown lists 511 displayed to the user 106 in the vehicle make and model input page 501. However, in another example embodiment, the vehicle information may include a vehicle identification number (VIN) of the vehicle 102 that may be manually inputted by the user 106 in a vehicle identification field 512 or obtained by scanning barcodes (or any other codes, such as QR codes) that represent the VIN (or are uniquely associated with a VIN, such as a rental fleet unit number or a plate number) by using an image or code scanning feature of the user computing device 108.

In yet another example embodiment, the vehicle information may include an image of an exterior of the vehicle 102, an interior of the vehicle, a dashboard or infotainment system of the vehicle 102 that can be used to determine the vehicle parameters and thereby identify the vehicle. In the example embodiment where the vehicle information comprises images of the infotainment systems or in general a recognizable part of the exteriors or interiors of the vehicle, vehicle parameters such as, but not limited to, the vehicle make, model, and year may be determined by running a computer vision artificial intelligence software that compares the current image with a database of past images, where the past images are collected independently from vehicle image databases but also over time by the privacy information removal application 110 itself. For example, a user would take a photo or point the camera at the interior of the vehicle (if using in augmented reality mode), and the computer vision artificial intelligence software would determine the most likely matches based on the images of the hardware and firmware. The determination of the vehicle's make, model, model year, and/or trim level based on the captured image using artificial intelligence is described in greater detail in the U.S. patent application Ser. No. 15/411,543, filed on Jan. 20, 2017, in the name of Andrea Amico and Mohit Prabhushankar and titled "Artificial Intelligence Based Vehicle Dashboard Analysis," the entire contents of which is hereby incorporated herein by reference.

In some examples where the image of the infotainment system is provided as input, the vehicle parameters determined by the server 114 may include the make, model, version, etc., of the infotainment system. The user 106 may capture the image by using an image capture feature of the user computing device 108.

In some other example embodiments, the vehicle information may include Wi-Fi and Bluetooth MAC addresses (but potentially RFIDs, wireless keys, and other connected/radio emitting vehicle sensors) of the vehicle 102 of the in-vehicle modules 104 that may be transmitted by the vehicle 102 and/or the in-vehicle modules 104. The computing device 108 may be configured to capture the radio frequency signals transmitted by the vehicle 102 and/or the in-vehicle modules 104, where the radio frequency signals may include, but is not limited to, the Wi-Fi and Bluetooth MAC addresses of the vehicle 102 and/or the in-vehicle modules 104. In said some other example embodiments, a reverse lookup may be performed either by the user computing device 108 or the privacy information removal server 114 on private or public sources (e.g., IEEE listings of assigned MAC addresses) to uniquely determine the in-vehicle module manufacturer (e.g., infotainment system manufacturer) and the approximate date of manufacturing, which would yield an approximation for the system version of the in-vehicle module 104.

In operations 422-426, the user computing device 108 displays the vehicle make and model input page and receives the vehicle information and transmits the vehicle information to the privacy information removal server 114. In operation 428, the input/output engine 202 of the privacy information removal server 114 receives the vehicle information and forwards said vehicle information to the make and model engine 206 of the privacy information removal server 114 if the information is anything other than a make, mode, and year that is selected by the user from the drop down lists 511 (e.g., if information is VIN, bar code, QR code, image of dashboard, image of in-vehicle module, live feed of image of interior of vehicle and in-vehicle module, etc.). Responsively, in operation 430, the make and model engine 206 operates in concert with the make and model database 218 to identify the vehicle parameters associated with the vehicle 102 such as, but not limited to, the make, model, trim, year, and/or any other appropriate feature of the vehicle 102 that uniquely identifies the vehicle 102. The make and model database 218 may include, but is not limited to, a listing of all the makes, models, years, and/or trims of vehicles; a mapping of VINs to specific makes, models, trims, and/or other features of a vehicle; and/or images of vehicle dashboards and infotainment systems for all the makes, models, and/or versions of in-vehicle modules. When the vehicle information is an image of the dashboard or infotainment system of the vehicle 102 or a live feed of a portion of the vehicle 102, the processor 212 of the privacy information removal server 114 processes the image and/or live feed using suitable image processing tools and operates in concert with the make and model database 218 to identify the vehicle parameters of the vehicle 102.

Responsive to identifying the vehicle parameters of the vehicle 102, in operation 432, the make and model engine 206 forwards the identified vehicle parameters of the vehicle 102 to the privacy information removal steps engine 208. The privacy information removal steps engine 208 operates in concert with the privacy information removal database 224 to query the privacy information removal database 224 and retrieve and create a file comprising data associated with erasing privacy information from a set of in-vehicle modules (hereinafter 'data associated with the set of in-vehicle modules'), where the set of in-vehicle modules may include the set of in-vehicle modules include the in-vehicle module 104 of the vehicle 102 matching the identified make, model, year, and/or trim; and/or in-vehicle modules of other vehicles that most-likely match or are related to the vehicle 102 of the identified make, model, year, and/or trim. The file comprising data associated with the set of in-vehicle modules may be created based on one or more of the vehicle parameters that are identified based on the vehicle information received from the computing device 108. In one example embodiment of operation 432 where the file comprising the data associated with the set of in-vehicle modules is created based on the make, model, and year of the vehicle 102 may be described below in greater detail in association with FIG. 6.

Turning to FIG. 6, the example process of creating the file (e.g., data file) (hereinafter 'privacy information removal file') comprising the data associated with the set of in-vehicle modules (i.e., candidate in-vehicle modules) begins at operation 602 where the privacy information removal steps engine 208 receives example vehicle parameters, i.e., the make, the model, and the model year of the vehicle 102 that comprises the in-vehicle module 104 from which privacy information of the user 106 is to be removed. Responsive to receiving information regarding the make, the model, and the model year of the vehicle 102; in operations 604 and 606, the privacy information removal steps engine 208 (hereinafter 'privacy engine 208) queries the privacy information removal database 224 (hereinafter 'privacy database 224) to determine if the privacy database 224 includes one or more instruction sets associated with erasing privacy information from a candidate in-vehicle module of a vehicle that matches the make, model, and model year of the vehicle 102. In some example embodiments, for a given make, model, and model year of a vehicle, the privacy database 224 may include multiple instruction sets associated with different trims and/or body types of the vehicle. For example, for a 2012 Nissan Rogue, the privacy database 224 may include multiple instruction sets associated with erasing privacy information from in-vehicle modules present in different trims of the 2012 Nissan Rogue such as in-vehicles modules in 2012 Nissan Rogue S, 2012 Nissan Rogue SV, 2012 Nissan Rogue SL, etc.

Responsive to a positive determination that there is only one instruction set associated with erasing privacy information from a candidate in-vehicle module of a vehicle that matches the make, model, and model year of the vehicle 102, in operation 610, the privacy engine 208 may retrieve the available instruction set and add it to the privacy information removal file. Alternatively, in response to a positive determination that there are multiple instruction sets, in operation 608, the privacy engine 208 may sort the instruction sets based on user rating associated with each of the instruction sets and add the sort instruction sets to the privacy information removal file. However, in other examples, the instruction sets may be sorted based on any other appropriate pre-determined criterion without departing from a broader scope of the present disclosure. In the example described above, for the 2012 Nissan Rogue, the instruction set associated with 2012 Nissan Rogue SL may have an average rating of 4.2 stars (rating from 1 star to 5 stars, where 5 stars represent the instruction set based on which a user was able to successfully remove privacy information from the in-vehicle module and the image of the in-vehicle module exactly matched the actual in-vehicle module), the 2012 Nissan Rogue SV may have an average rating of 4.9 stars, and 2012 Nissan Rogue S may have an average rating of 3 stars. Accordingly, in said example, the instruction set associated with the 2012 Nissan Rogue SV may be positioned above 2012 Nissan Rogue SL and 2012 Nissan Rogue S. In some example embodiments, instead of adding all the sorted instruction sets to the privacy information removal file, only the highest rated instruction set may be added to the privacy information removal file.

The users may use the example star ratings (1 star-5 star rating) after using an instruction set to describe how well it worked. Over time, the star ratings for a given instruction sets accumulate, so values for any given set of instructions range from 0 (new instruction set, never used before) to 5 (every time the instruction set has been used, it has received 5 stars). Said values associated with the instruction sets may also be used to sort when multiple instruction sets are present.

In some example embodiments, responsive to adding the instruction sets associated with the in-vehicle modules of the vehicle that matches the make, model, and model year of the vehicle 102, the privacy engine 208 proceeds to operation 612 to add instruction sets associated with erasing privacy information from candidate in-vehicle modules of other vehicles that are related to the vehicle 102. However, in other example embodiments, the privacy engine 208 may proceed to operation 612 only if instruction sets associated with the candidate in-vehicle modules of the vehicle that matches the make, model, and model year of the vehicle 102 are unavailable. In operation 604, if the privacy engine 208 determines that the privacy database 224 does not include instruction sets associated with erasing privacy information from a candidate in-vehicle module of a vehicle that matches the make, model, and model year of the vehicle 102, the privacy engine 208 proceeds to operation 612.

In operations 612-614, the privacy engine 208 queries the privacy database 224 to determine if the privacy database 224 includes one or more instruction sets associated with erasing privacy information from a candidate in-vehicle module of a vehicle having the same make and model of the vehicle 102 but having a model year that varies from or is greater than the model year of the vehicle 102 by one year. That is, in the example provided above, for a 2012 Nissan Rogue, the privacy engine 208 determines if the privacy database 224 includes instruction sets associated with erasing privacy information from in-vehicle modules present in the 2013 Nissan Rogue. Responsive to a positive determination that there is only one instruction set associated with erasing privacy information from a candidate in-vehicle module of a vehicle having the same make and model of the vehicle 102 but having a model year that is greater than the model year of the vehicle 102 by one year, in operation 618, the privacy engine 208 may retrieve the available instruction set and add it to the privacy information removal file. Alternatively, in response to a positive determination that there are multiple instruction sets, in operation 616, the privacy engine 208 may sort the instruction sets based on user rating associated with each of the instruction sets and the sorted instruction sets are added to the privacy information removal file.

Responsive to adding the instruction sets associated with the in-vehicle modules of the vehicle having the same make and model of the vehicle 102 but having a model year that is greater than the model year of the vehicle 102 by one year, the privacy engine 208 proceeds to operation 620 to add instruction sets associated with erasing privacy information from candidate in-vehicle modules of other vehicles that are related to the vehicle 102. In other example embodiments, the privacy engine 208 may proceed to operation 620 only upon a negative determination in operation 612. In operation 612, if the privacy engine 208 determines that the privacy database 224 does not include instruction sets associated with erasing privacy information from a candidate in-vehicle module of a vehicle having the same make and model of the vehicle 102 but having a model year that is greater than the model year of the vehicle 102 by one year, the privacy engine 208 proceeds to operation 620.

Then, in operations 620-622, the privacy engine 208 queries the privacy database 224 to determine if the privacy database 224 includes one or more instruction sets associated with erasing privacy information from a candidate in-vehicle module of a vehicle having the same make and model of the vehicle 102 but having a model year that is one year lesser than the model year of the vehicle 102. That is, in the example provided above, for a 2012 Nissan Rogue, the privacy engine 208 determines if the privacy database 224 includes instruction sets associated with erasing privacy information from in-vehicle modules present in the 2011 Nissan Rogue. Responsive to a positive determination that there is only one instruction set associated with erasing privacy information from a candidate in-vehicle module of a vehicle having the same make and model of the vehicle 102 but having a model year that is one year less than the model year of the vehicle 102, in operation 626, the privacy engine 208 may retrieve the available instruction set and add it to the privacy information removal file. Alternatively, in response to a positive determination that there are multiple instruction sets, in operation 624, the privacy engine 208 may sort the instruction sets based on user rating associated with each of the instruction sets and the sorted instruction sets are added to the privacy information removal file.

Responsive to adding the instruction sets associated with the candidate in-vehicle modules of the vehicle having the same make and model of the vehicle 102 but having a model year that is one year lesser than the model year of the vehicle 102, the privacy engine 208 proceeds to operation 628 to add instruction sets associated with erasing privacy information from candidate in-vehicle modules of other vehicles that are related to the vehicle 102. In other example embodiments, the privacy engine 208 may proceed to operation 628 only upon a negative determination in operation 620. Further, in operation 620, if the privacy engine 208 determines that the privacy database 224 does not include instruction sets associated with erasing privacy information from a candidate in-vehicle module of a vehicle having the same make and model of the vehicle 102 but having a model year that is one year lesser than the model year of the vehicle 102, the privacy engine 208 proceeds to operation 628.

In operation 628, the privacy engine 208 queries the privacy database 224 to determine if the privacy database 224 includes instruction sets associated with erasing privacy information from candidate in-vehicle modules of vehicles of all the other models having the same make and model year of the vehicle 102. That is, in the example provided above, for a 2012 Nissan Rogue, the privacy engine 208 determines if the privacy database 224 includes instruction sets associated with erasing privacy information from in-vehicle modules present in the 2012 Nissan Altima, 2012 Nissan Versa, 2012 Nissan Maxima, 2012 Nissan Juke, 2012 Nissan Armada, etc. Responsive to a positive determination that there are instruction sets associated with at least one other model of the vehicle having the same make and model year of the vehicle 102, in operation 632, the privacy engine 208 may sort the instruction sets based on user rating associated with each of the instruction sets and the sorted instruction sets are added to the privacy information removal file.

Then, in operations 634-648, the privacy engine 208 queries the privacy database 224 to determine if the privacy database 224 includes instruction sets associated with erasing privacy information from candidate in-vehicle modules of a vehicle having the same make and model of the vehicle 102 but having a model year that is two year less than and two years more than the model year of the vehicle 102. That is, in the example provided above, for a 2012 Nissan Rogue, the privacy engine 208 determines if the privacy database 224 includes instruction sets associated with erasing privacy information from in-vehicle modules present in the 2014 Nissan Rogue and 2010 Nissan Rogue. Responsive to a positive determination that there are one or more instruction sets associated with the vehicle having the same make and model of the vehicle 102 but having a model year that is two year less than and two years more than the model year of the vehicle 102, the privacy engine 208 may sort the instruction sets based on user rating associated with each of the instruction sets and the sorted instruction sets are added to the privacy information removal file.

Then, in operations 650-660, the privacy engine 208 queries the privacy database 224 to determine if the privacy database 224 includes instruction sets associated with erasing privacy information from candidate in-vehicle modules of vehicles of all the other models of the same make of the vehicle 102 but with model years that are one year more than and one year less than the model year of the vehicle 102. That is, in the example provided above, for a 2012 Nissan Rogue, the privacy engine 208 determines if the privacy database 224 includes instruction sets associated with erasing privacy information from in-vehicle modules present in the 2011 Nissan Altima, 2013 Nissan Altima, 2011 Nissan Versa, 2011 Nissan Versa, 2011 Nissan Maxima, 2013 Nissan Maxima, 2011 Nissan Armada, 2013 Nissan Armada, etc. Responsive to a positive determination that there are instruction sets associated with at least one other model of the vehicle having the same make and model year that is one year less than and one year more than the model year of the vehicle 102, the privacy engine 208 may sort the instruction sets based on user rating associated with each of the instruction sets and the sorted instruction sets are added to the privacy information removal file. Responsively, the process may end at operation 662.

In some example embodiments, the instruction sets included in the privacy information removal file may be arranged based on a ranking that represents a likely order of resemblance of the in-vehicle modules (i.e., candidate in-vehicle modules) with the actual in-vehicle module 104 (i.e., target in-vehicle module) of the vehicle 102. In the example process illustrated in FIG. 6, the instruction sets associated with candidate in-vehicle modules of vehicles that match the make, model, and model year of the vehicle 102 (e.g., instruction sets in operations 608 and 610) may be ranked higher than the instruction sets associated with candidate in-vehicle modules of other vehicles that may have the same make and model of the vehicle 102, but have another model year; or the same make and model year, but a different model; etc. The ranking and/or likely order of resemblance may be added to the privacy information removal file. The privacy information removal application 110 may use the ranking to determine an order in which the instruction sets or images of the set of candidate in-vehicle modules may be displayed to the user 106 (e.g., see 502 of FIG. 5). For example, the image of the candidate in-vehicle module that matches the make, model, and model year of the vehicle 102 and is ranked highest may be displayed first followed by the images of the remaining candidate in-vehicle modules of the set of in-vehicle modules based on their ranking or likely order of resemblance with respect to the actual in-vehicle module.

In other example embodiments, the instruction sets may be arranged in any other order based on any other ranking criteria without departing from a broader scope of the present disclosure. For example, when a user searches for a privacy information removal data associated with a vehicle having a certain make, model year, model, if the privacy engine 208 knows that historically users who selected that vehicle had the best outcome (meaning gave the highest rating) with a certain instruction set, the privacy engine 208 may override the algorithm or the above described process of creating the privacy information removal file and use the historical heuristics to re-prioritize which instruction set options are displayed first. This can be done either deterministically (e.g., by building tables of outcomes for all the historical combinations of vehicle selections vs instruction selection and success) or through an Artificial Intelligence/Machine Learning algorithm.

Further, it is noted that the process of creating the privacy information removal file based on is created based on the make, model, and model year of the vehicle 102 as described above in FIG. 6 is an example process and is not limiting. That is, in other example embodiments, the privacy information removal file may be created based on additional or other vehicle parameters without departing from a broader scope of the present disclosure. For example, in addition to the make, the model, and the model year of the vehicle, the vehicle parameters may include a trim level of the vehicle. The trim levels can either be an input from the user, or determined from the VIN, or determined from images, etc. In another example, the vehicle parameters that are used to create the privacy information removal file may include geography or manufacturing location of the vehicle. The geography may affect the instruction sets because manufacturers may deploy different versions of the in-vehicle modules in different geographies. That is, the version of the in-vehicle modules installed in vehicles may be different in different geographies. Providing additional vehicle parameters in the process of creating the privacy information removal file may provide better matches of in-vehicle modules and instructions sets associated with removal of privacy information from the in-vehicle modules. That is, the additional vehicle parameters such as, but not limited to, the trim level, the geography, etc., may enhance and further refine the data of the set of in-vehicle modules included in the privacy information removal file.

In some example embodiments, in addition to or instead of vehicle parameters, the privacy engine 208 may use in-vehicle module parameters associated with the in-vehicle module 104 of the vehicle 102 to create the privacy information removal file. For example, an infotainment system manufacturer and version may be used to create the privacy information removal file. Information associated with the in-vehicle module parameters can either be provided as an input by the user 106 (who could for instance obtain it by reading the vehicle manual, from the infotainment system menus, or from labels on the hardware), but can also be indirectly assessed by detecting, for instance, a Wi-Fi or Bluetooth MAC address of the vehicle. In one example, the computing device 108 of the user 106 may include features for capturing any radio frequency signals emitted by the vehicle 102. This includes, by means of example, Wi-Fi and Bluetooth MAC addresses (but potentially RFIDs, wireless keys, and other connected/radio emitting vehicle sensors). In said example, a reverse lookup can be done on the Wi-Fi and Bluetooth MAC addresses by using private or public sources (e.g., IEEE listings of assigned MAC addresses) to uniquely determine the infotainment system manufacturer and the approximate date of manufacturing, which would yield an approximation for the version of the in-vehicle module.

Even though the present disclosure describes the privacy information removal file created by the process in FIG. 6 as comprising data associated with erasing privacy information from a set of in-vehicle modules of different model years and models, but of the same make as the make of the vehicle 102, one of skill in the art can understand and appreciate that in other example embodiments, the privacy information removal file may include instruction sets associated with in-vehicle modules of vehicles having makes other than the make of the vehicle 102 provided that the makes are associated with the same OEM group. That is, the process of creating the privacy information removal file as described in FIG. 6 does not sort instructions outside of the make that the user selected/scanned. However, one of skill in the art can understand and appreciate that in other example embodiments, instruction sets associated with in-vehicle modules across makes from the same OEM group may be included in the privacy information removal file since said in-vehicle modules may have similarities. For example, for a Jaguar vehicle, the privacy engine 208 may provide instruction sets associated with removing privacy information from in-vehicle modules of Land Rover vehicles which may be similar to the in-vehicle modules of the Jaguar vehicles because they belong to or are associated with the same OEM group.

The data associated with the set of in-vehicle modules that are included in the privacy information removal file may include instruction sets associated with erasing privacy information from each in-vehicle module of the set of in-vehicle modules, activating or deactivating privacy modes from each in-vehicle module of the set of in-vehicle modules, activating or deactivating location services and/or connected services from each in-vehicle module of the set of in-vehicle modules, and/or activating or deactivating pairing between the computer device 108 and the vehicle 102, including deauthorization of certain users, modules, or devices, user account resets, deletion of connected apps, etc. Each instruction set may include a sequence of instructions (textual commands), where each instruction may include a corresponding image with numbered callouts embedded therein (or overlaid thereon). In some example embodiments, the instruction sets may not include images and textual commands. Instead, in said some example embodiments, the instruction sets may include voice clips or files that provide voice commands for a user to follow.

Turning back to FIG. 4, responsive to creating the privacy information removal file comprising the data associated with erasing privacy information from a set of in-vehicle modules, in operations 434-436, the input/output engine 202 of the privacy information removal server 114 transmits the privacy information removal file to the user computing device 108. Responsive to receiving the privacy information removal file, the user computing device 108 displays images 502 of the set of candidate in-vehicle modules in the likely order of resemblance included in the privacy information removal file. In some example embodiments, any other appropriate visual or auditory indicators associated with the set of candidate in-vehicle modules other than the images may be presented via the computing device. In one embodiment, the privacy information removal file may only include data associated with erasing privacy information from one in-vehicle module (e.g., the privacy engine 208 only found one instruction set for the in-vehicle module related to vehicle 102), and the computing device 108 may automatically display the instruction set for removing the privacy information from the in-vehicle module rather than displaying an image of the in-vehicle module for the user to select.

Responsive to presenting the images of the candidate in-vehicle modules, the user computing device 108 may prompt the user 106 to select one of the images of the set of candidate in-vehicle modules that matches the actual in-vehicle module 104 of the vehicle 102. Once the image of the candidate in-vehicle module that matches the actual in-vehicle module 104 of the vehicle 102 is selected, the privacy information removal application 110 may display the instruction set 503 (shown in FIG. 5) associated with removing privacy information from the selected candidate in-vehicle module. The instruction set 503 may be presented along with the corresponding images of the selected candidate in-vehicle module and callouts that the user can follow to erase the privacy information of the user 106 from the in-vehicle module 104 of the vehicle 102 by resetting the in-vehicle module 104. In some example embodiments, the instructions will have auto scroll with a delay (3-5 seconds) or alternatively, the user 106 can switch to a manual scroll. If the vehicle 102 includes more than one in-vehicle module or submodule, the computing device 108 may automatically display the instruction set for each of the more than one in-vehicle modules and/or submodules in a list or in sequential display screens.

In another embodiment, once the user selects one of the images of the set of candidate in-vehicle modules, the computing device 108 may then present an image representing each in-vehicle module and/or submodule associated with the target vehicle 102. For example, the computing device 108 may present images of candidate in-vehicle modules, wherein the in-vehicle modules represent different vehicle make, model, and/or trim styles (e.g., 2012 Nissan Rogue S, 2012 Nissan Rogue SL, 2012 Nissan Rogue SV), and upon selection of one of the presented images (e.g., user selects the image associated with the 2012 Nissan Rogue SL), the computing device 108 may then present an image of each in-vehicle module and/or submodule associated with the target vehicle (e.g., navigation submodule, garage-door module, etc., associated with a 2012 Nissan Rogue SL). The user 106 may select one of the presented images of the in-vehicle modules and/or submodules associated with the target vehicle, and the computing device 108 may then display the instruction set 503 for the selected in-vehicle module or submodule (e.g., instruction set for removing data). After the user removes the privacy information for the selected in-vehicle module or submodule, the computing device 108 may prompt the user for confirmation of success and feedback and confirmation. The computing device 108 may then present for selection the images of each in-vehicle module and submodule associated with the target vehicle so that the user 106 may select another in-vehicle module or submodule to remove privacy information from.

In other example embodiments, once the user 106 selects one of the presented images of the in-vehicle modules associated with the target vehicle, the computing device 108 may present a prompt in the form of a question or checklist that allows the user 106 to choose additional instructions to be included in the instruction set 503, wherein the additional instructions may be step-by-step instructions for activating or deactivating privacy modes from each in-vehicle module of the set of in-vehicle modules, activating and deactivating location services and/or connected services from each in-vehicle module of the set of in-vehicle modules, removing other users from being able to access connected services and information, terminating subscription or free/freemium services that include privacy implications (SiriusXM, Spotify, etc.), modifying the privacy information consent for subscription or free/freemium services, and activating or deactivating pairing between the computer device 108 and the vehicle 102, including deauthorization of certain users, modules, or devices, user account resets, deletion of connected apps, etc. For example, a user 106 may have the privacy information removal app 110 downloaded on the computing device 108 and use it to delete, remove, or otherwise deauthorize, an authentication key/token/saved setting stored on the vehicle 102 and/or in-vehicle module 104 to stop certain communications between the vehicle 102 and/or in-vehicle module 104 and a manufacturer server (e.g., a server operated by a manufacturer of the vehicle 102 or in-vehicle module 104, such as manufacturer server 904). Other user computing devices (e.g., user computing device 906) of previous owners or users of the vehicle 102 or in-vehicle module 104 may also have authentication keys/tokens/saved settings stored in the vehicle 102 (or in-vehicle module 104) and on a manufacturer server (e.g., manufacturer server 904). The user 106, through a prompt on the privacy information removal application 110 on the computing device 108, may make a selection on the computing device such that the instruction set 503 includes step by step instructions on removing the authentication key/token/saved setting or otherwise breaking the pairing between the vehicle 102 (or in-vehicle module 104) and another computing device (e.g., user computing device 906) or otherwise stop certain communications between them. Specifically, the instruction set 503 may provide instructions on how to remove the authentication key/token/saved setting through the manufacturer mobile application (e.g., mobile application 902) on the other user's computing device, through the manufacturer server (e.g., manufacturer server 904) via an API or other communication from the privacy information removal app 110 and/or through the vehicle 102 (e.g., through the infotainment system of the vehicle 102) or in-vehicle module 104, which propagates the breaking of the authentication key/token/saved setting relationship up to the manufacturer server and to the other user's computing device/manufacturer application on the other user's computing device. Once the user 106 breaks the authentication key/token/saved setting relationship pairing between the manufacturer mobile application on the other user's computing device (e.g., computing device 906) and the vehicle 102 (or in-vehicle module 104), the other user's computing device may no longer send or receive privacy information to or from the manufacturer server or vehicle 102 (or in-vehicle module 104) or otherwise reduce or constraint the data collection, usage, sharing, or selling.

In another example embodiment, a user 106 may be operating a vehicle 102 that, through an in-vehicle module, is sharing the location of the vehicle 102 with a different user. For example, a user 106 may buy a used car from another person who has a computing device 108 in communication with the vehicle 102, such that the former owner may access the location of the vehicle 102, stored previous locations of the vehicle 102, automatic engine start features, and other information as described herein that is associated with the vehicle 102. The user 106 (the new owner), utilizing the privacy information removal system 100, may remove the previous owner's access to the vehicle information, by removing the previous owner as an authorized user or changing the authorized user to the new owner (user 106), or any other method of revoking access to the privacy information for the previous owner. In such instances, the instruction set 503 may provide step by step instructions for removing individual users' ability to communicate with the vehicle 102 or any in-vehicle modules associated with the vehicle 102, or to disable the location services for a single user, rather than all users of the vehicle 102.

In another example, the instruction set 503 may include step by step instructions for modifying the privacy information consent or data retention consent from third parties subscription services or free/freemium services (e.g., SiriusXM, Spotify, etc.). In many embodiments, modifying the information consent or data retention consent may include communicating with the third party service provider a request to not share personal information with other third parties, a request to not collect any personal information by the third party service provider, or removing access to personal information in the vehicle from the third party service provider (e.g., turning location services off).

In yet another example, the instruction set 503 may include step by step instructions for deleting, deauthorizing, dissociating, or otherwise stop eWallets from working so that neither the new user of the vehicle can make (possibly fraudulent) charges using a prior user's saved payment methods, nor the old user can see purchases and transactions made by the new owner because linked to the previous user's account.

In certain embodiments, the in-vehicle module 104 of the vehicle 102 may be an aftermarket device (e.g., a GPS device, an aftermarket infotainment system, an aftermarket telematic device, a Bluetooth tracker, a dashcam, an alarm, an insurance sensor or dongle, etc.) that is not associated with the vehicle 102 within the database 224. For example, the database 224 would not associate an instruction set 503 for a Garmin GPS device or Kenwood multimedia receiver with any target vehicles since aftermarket devices are not associated with any one vehicle. For such aftermarket devices, which are substantially analogous to the SD devices 704 (as described below in relation to FIG. 7 and FIG. 8), the user 106 may locate and identify aftermarket devices that are connected to the vehicle (e.g. by category, such as OBD2 port plug-ins, dash cameras, etc.), remove privacy information from the devices, disconnect the devices from the vehicle 102, and/or, if the aftermarket device was previously owned, reassign ownership of the aftermarket device to the user 106. For such instances in which a user 106 is removing privacy information from aftermarket devices, the user 106 may input information for the aftermarket device into the application 110. For example, the user 106 may input information to the application 110 regarding an aftermarket device, the user may provide an image of the aftermarket device, the user may scan a QR code or bar code associated with the aftermarket device, etc. The input information for the aftermarket device may include, but is not limited to, make and model number of the aftermarket device, manufacturer information, image of the device, QR code or bar code, etc., and the computing device 108 sends the input information to the backend server 114. Depending on the input information, the backend server 114 may provide only one instruction set 503 for the aftermarket device associated with the vehicle 102 (this may include instructions for a generic, standardized device, such as a garage door opener that follows the HomeLink protocol, as illustrated previously), or the backend server 114 may provide multiple instruction sets for a set of candidate aftermarket devices (this may include instructions for a narrow set of alternative generic devices, such as OBD2 port devices or Bluetooth trackers, as illustrated previously), such that the computing device 106 shows images of each of the candidate aftermarket devices to the user 106, and the user 106 selects the image of the candidate aftermarket device associated with the vehicle 102. For example, if the input received by the computing device 108 includes the manufacturer information and model number of the aftermarket device, the backend server 114, via the database 224, may provide the instruction set 503 associated with such input information. However, if the input received by the computing device 108 includes, for example, only an image of the aftermarket device, the backend server 114 may provide multiple instruction sets 503 that may be associated with the aftermarket device, and cause the computing device 108 to provide images of a set of candidate in-vehicle aftermarket devices for the user to select from.

In another embodiment, the application 110 may provide a drop-down menu or searchable database of device types (e.g., OBD2 dongles, dashcams) or manufacturers of aftermarket devices on the computing device 110, so that the user 106 may search and select the device type and/or manufacturer of the aftermarket device associated with the vehicle 102 from which privacy information is being removed. Once the user 106 selects the device type and/or manufacturer of the aftermarket device, the application 110 may provide a list of makes and/or models of various aftermarket devices associated with the selected device type or manufacturer, and the user 106 may select the make and/or model of the aftermarket device associated with the vehicle 102. The device type, manufacturer, make, and/or model of the aftermarket device may be utilized as the input information for the backend server 114, and the backend server 114 may provide the instruction set 503 to the computing device 108 as described herein.

In other example embodiments, using the camera of the user computing device 108, a live image of the in-vehicle module may be rendered on the display of the user computing device 108. In said other example embodiments, responsive to identifying the vehicle parameters of the vehicle, and the corresponding instructions for removal of privacy data from the in-vehicle modules, the privacy information removal application 110 may be configured to overlay the callouts and the related instructions over the rendered live image of the in-vehicle module. As the user executes each instruction on the in-vehicle module by following the callouts and the related instructions, the next sequence of callouts and instructions will be overlaid on the rendered live image of the in-vehicle module. In other words, as the user points the phone at the infotainment system, augmented reality may be used to display the instructions as "floating" on the actual system or the rendered live image of the actual system. For example, callout number 1 may be overlaid over a first button in the live image of the user computing device 106. When the user computing device 108 determines that the first instruction has been executed, the second callout may be overlaid over another button along with the second instruction and so on till the instruction set is exhausted or the privacy information is removed from the in-vehicle module. In some examples, the privacy information removal application 110 of the user computing device 108 can decode the pattern or movement of the user's finger(s) or hand to automatically determine that an instruction has been executed on the in-vehicle module. In other examples, the privacy information removal application 110 of the user computing device 108 generates a prompt requesting the user to provide an input indicating that the current instruction has been executed and the next instruction is to be issued/displayed.

In other embodiments, once the user 106 selects one of the presented images of the in-vehicle modules and/or submodules associated with the target vehicle (including possibly aftermarket devices), the privacy information removal system 100 may, via API, delete the privacy information for the selected in-vehicle module(s) 104. The API may function by causing the backend server 114 to communicate with the manufacturer's server of the selected in-vehicle module(s) 104, with such communication requesting the deletion of the user's privacy information from the manufacturer's server and from the in-vehicle module(s) 104. In some embodiments, the manufacturer's server may require authentication from the user that the data privacy removal request is legitimate before deleting any privacy information, causing the privacy information removal system 100 to provide such authentication to the manufacturer's server. Such authentication may be provided for implicitly by the user 106 agreeing to the terms and conditions of the mobile application 110, or may be a prompt that the user 106 is caused to respond to on the front-end application, or any other method of authenticating the deletion request.

In operations 438 and 440, the privacy information removal application 110 prompts the user 106 to confirm whether the images displayed along with the instruction set matched the in-vehicle module 104, and/or whether the user 106 was able to follow the displayed instruction set and successfully erase the privacy information of the user 106 by resetting the in-vehicle modules 104. If the user 106 confirms that the images displayed along with the instruction set matched the in-vehicle modules 104 and the user 106 was able to successfully erase the privacy information of the user 106 by following the instructions of the instruction set, then, the process 400 ends in operation 442. However, in some example embodiments, prior to ending the process 400, in operation 442, the user computing device 108 may transmit, to the privacy information removal server 114, the confirmation that the images displayed along with the instruction set matched the in-vehicle modules 104 and the user 106 was able to successfully erase the privacy information of the user 106 by following the instructions of the instruction set. The confirmation may include feedback from the user in the form of comments, voice recordings, images of the in-vehicle module from which the privacy information was removed and/or simply a "submit", "confirm", "finish" or similar button designed to communicate that the process is over. The confirmation may be stored in the user experience database 226 of the privacy information removal server 114 and used to improve the instruction set, rework the instruction set, improve and optimize the creation of new instruction set, and/or improve and optimize the building of the privacy information removal database 224. In addition to being stored in the user experience database 226 of the privacy information removal server 114, a copy of the confirmation or feedback may be stored in a memory associated with the computing device 108 by the privacy information removal application 110. The confirmation or user feedback that is stored user experience database 226 may provide a record of the successful (or unsuccessful) deletion of the privacy information of the user from in-vehicle module 104 of the vehicle 102.

In some example embodiments where the user 106 is not a consumer who owns the vehicle 102, responsive to receiving the confirmation that the vehicle 102 containing the private information of the user 106 underwent a private data deletion process, the privacy information removal server 114 may be configured to store the confirmation (or feedback) and also transmit said confirmation to the owner so that the owner is made aware and has a record that the privacy information of the user 106 has been successfully removed from the vehicle 102. In another embodiment, the confirmation that the vehicle 102 containing the private information of the user 106 underwent a private data deletion process, the privacy information removal server 114 may be configured to transmit said confirmation to a third party (for example, a provider who is performing the deletion service on behalf of the owner, a vehicle history reporting provider, an OEM, etc.) so as to prove the service has been performed, and that the privacy information of the user 106 has been successfully removed from the vehicle 102.

However, if the images displayed along with the instruction set do not match the in-vehicle modules 104 and/or the user 106 was unable to successfully erase the privacy information of the user 106 by resetting the in-vehicle modules 104 by following the instructions of the instruction set, then, in operation 444, the privacy information removal application 110 may prompt the user 106 to provide feedback and/or comments regarding the user's experience. The feedback and comments may include, but are not limited to, why the user was not able to delete the privacy information; the specific instructions from the instruction set that did not work; any error messages that were displayed; an image of the in-vehicle modules 104; etc. Responsively, in operations 446-448, the feedback and comments may be transmitted to and stored in the user experience database 226 of the privacy information removal server 114 for improving and/or reworking the instruction set and/or the images for the specific make, model, year, and/or trim of the vehicle 102.

Figure 5A:
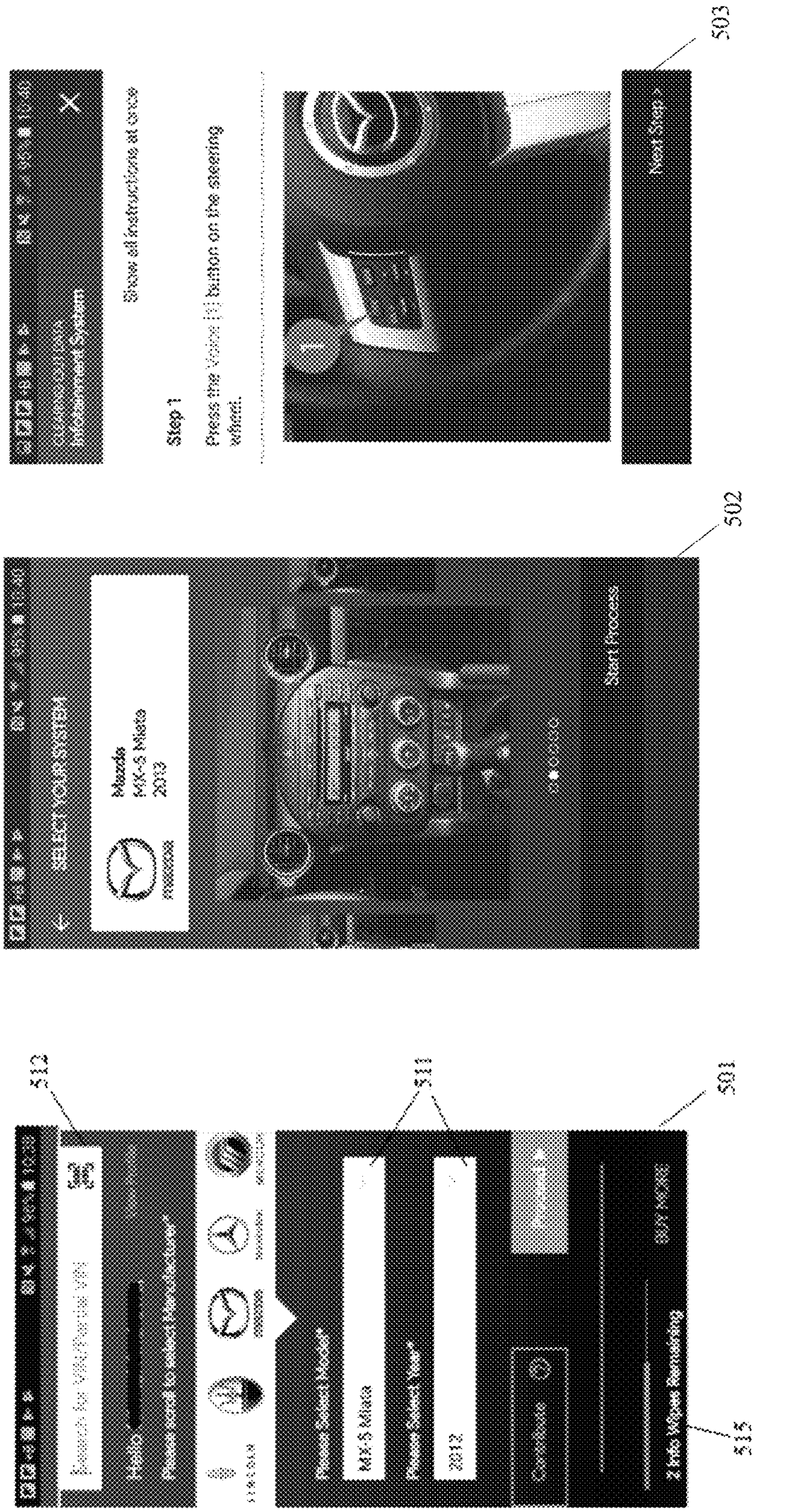
FIGS. 5A-5B (collectively 'FIG. 5') illustrates example user interface screenshots of the privacy information removal application, in accordance with example embodiments of the present disclosure.
Figure 5B:
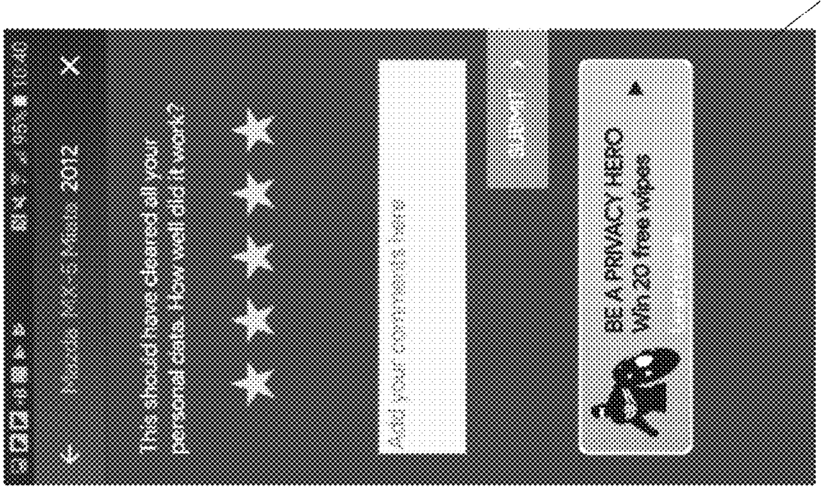
Figure 6A:
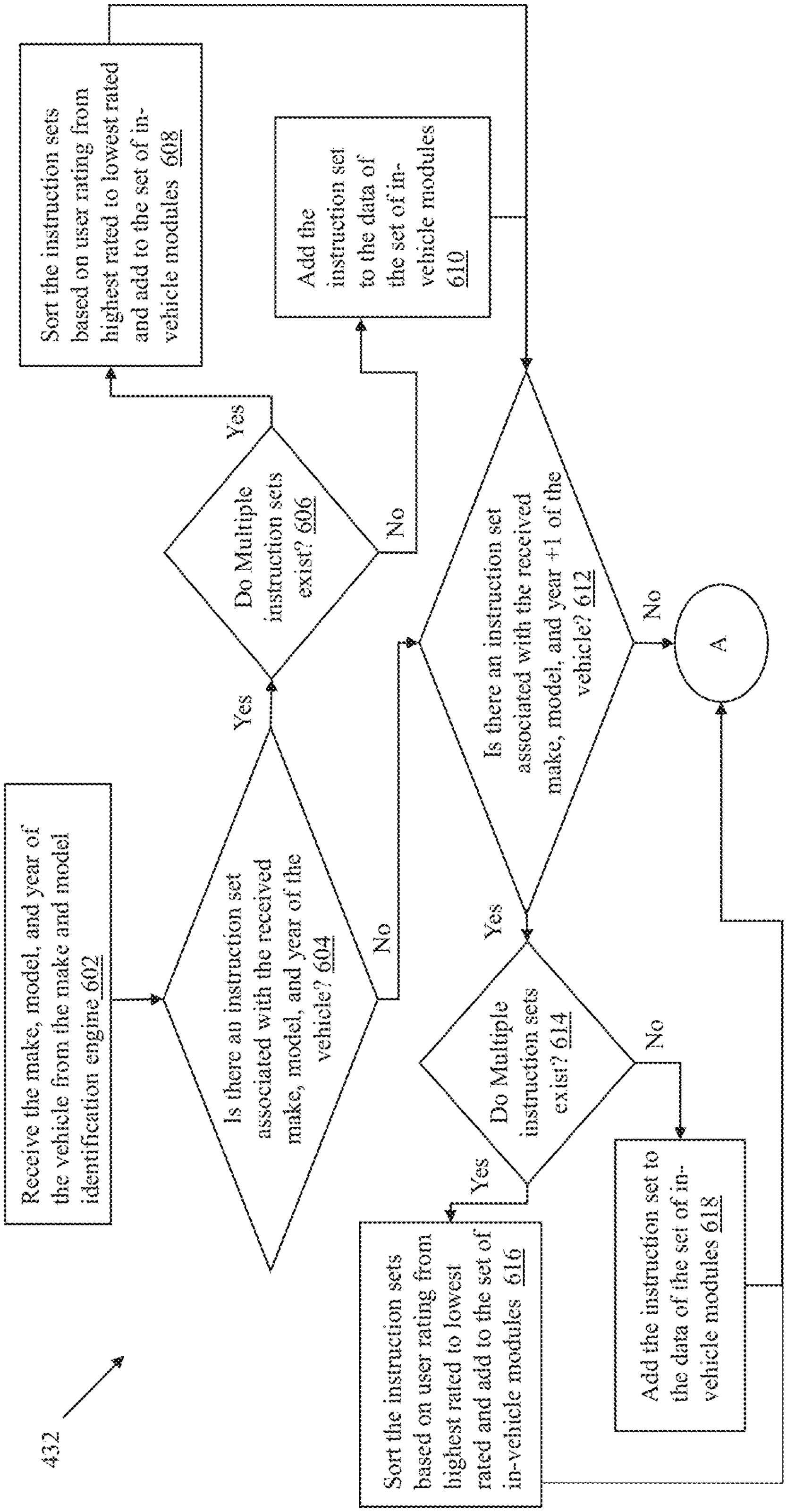
FIGS. 6A-6D (collectively 'FIG. 6') are flowcharts that illustrate an example method of creating and presenting a list of most likely in-vehicle systems and instruction sets associated with removing the user's private data from the vehicle, in accordance with example embodiments of the present disclosure.
Figure 6B:
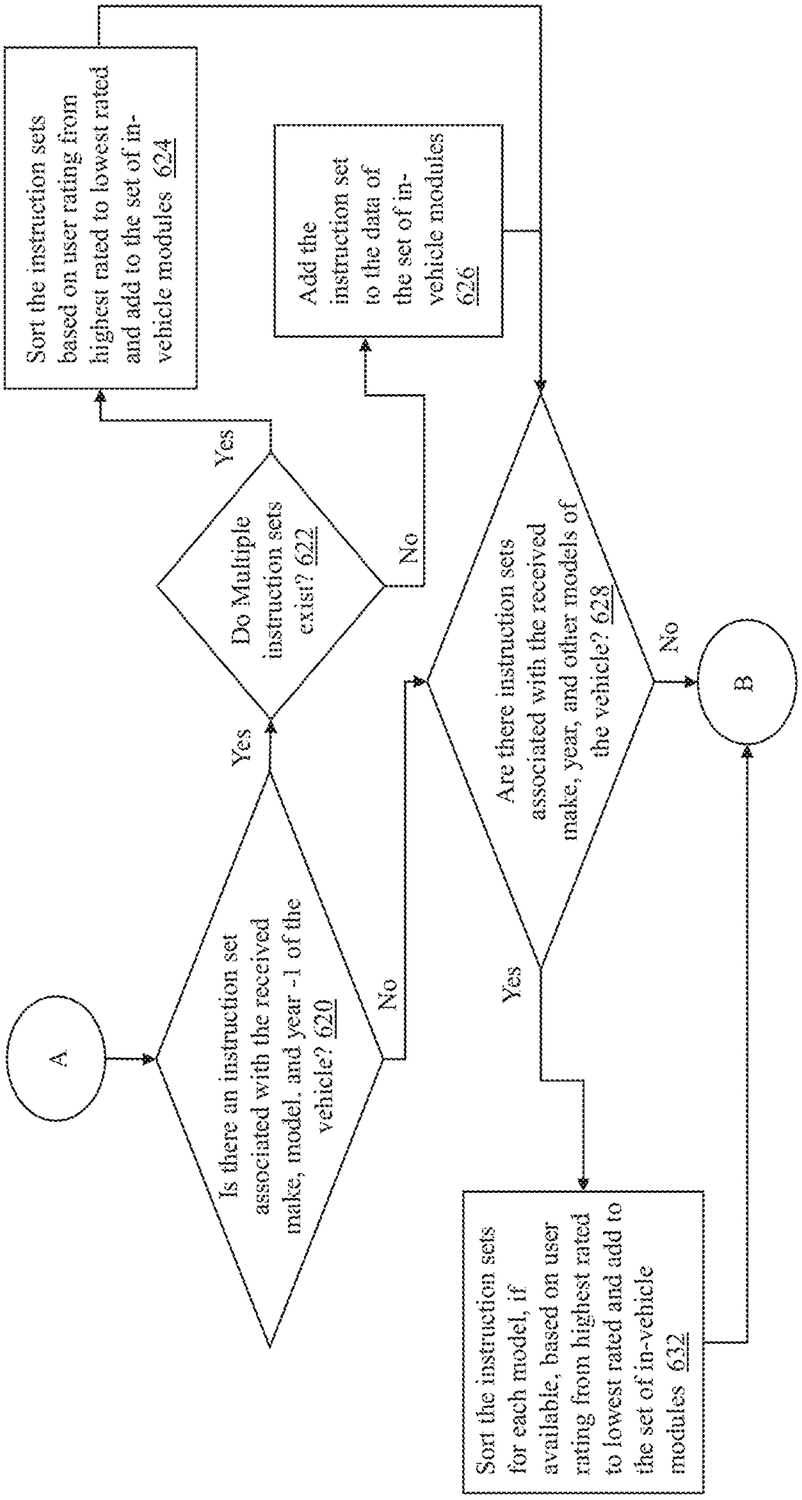
Figure 6C:
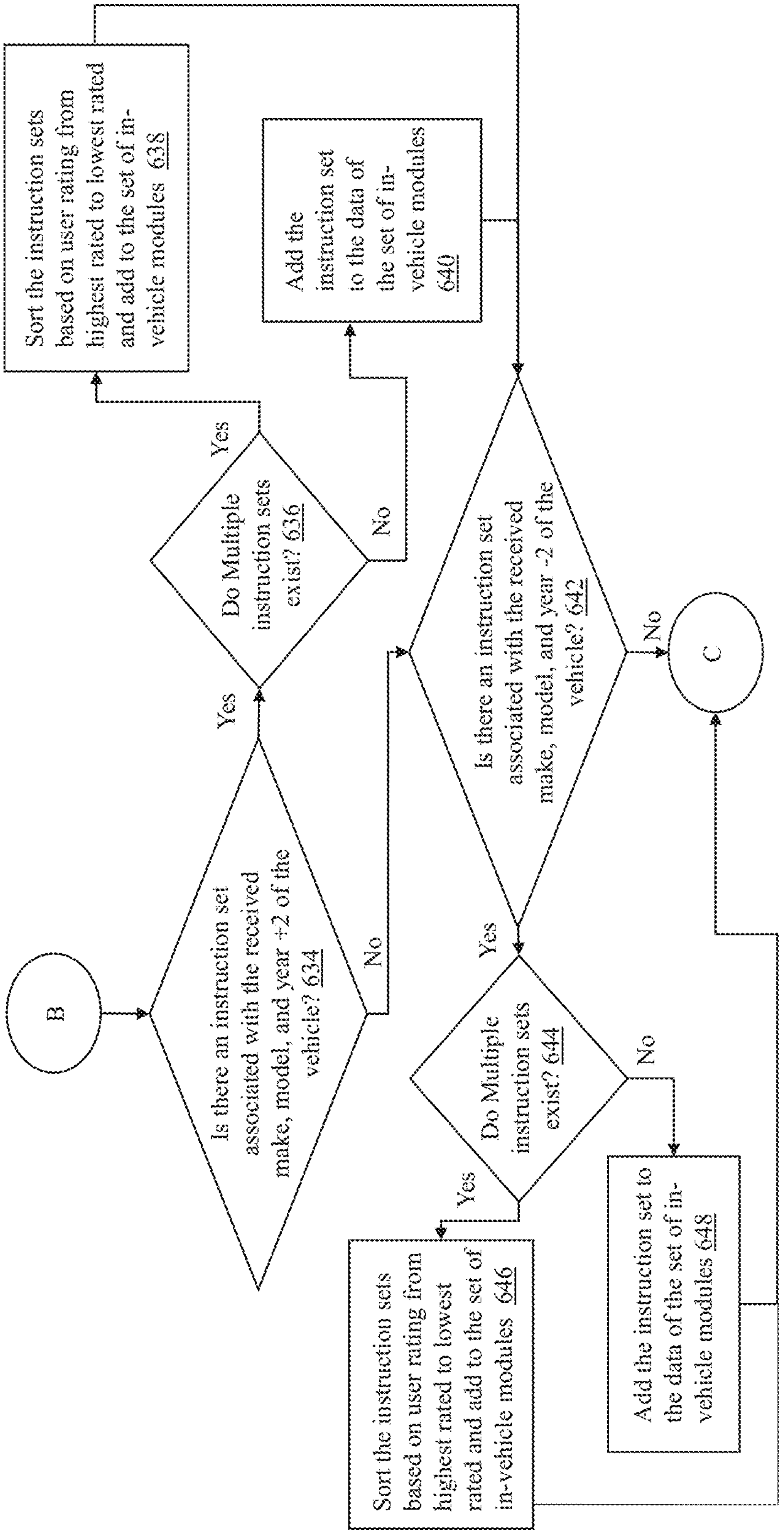
Figure 6D:
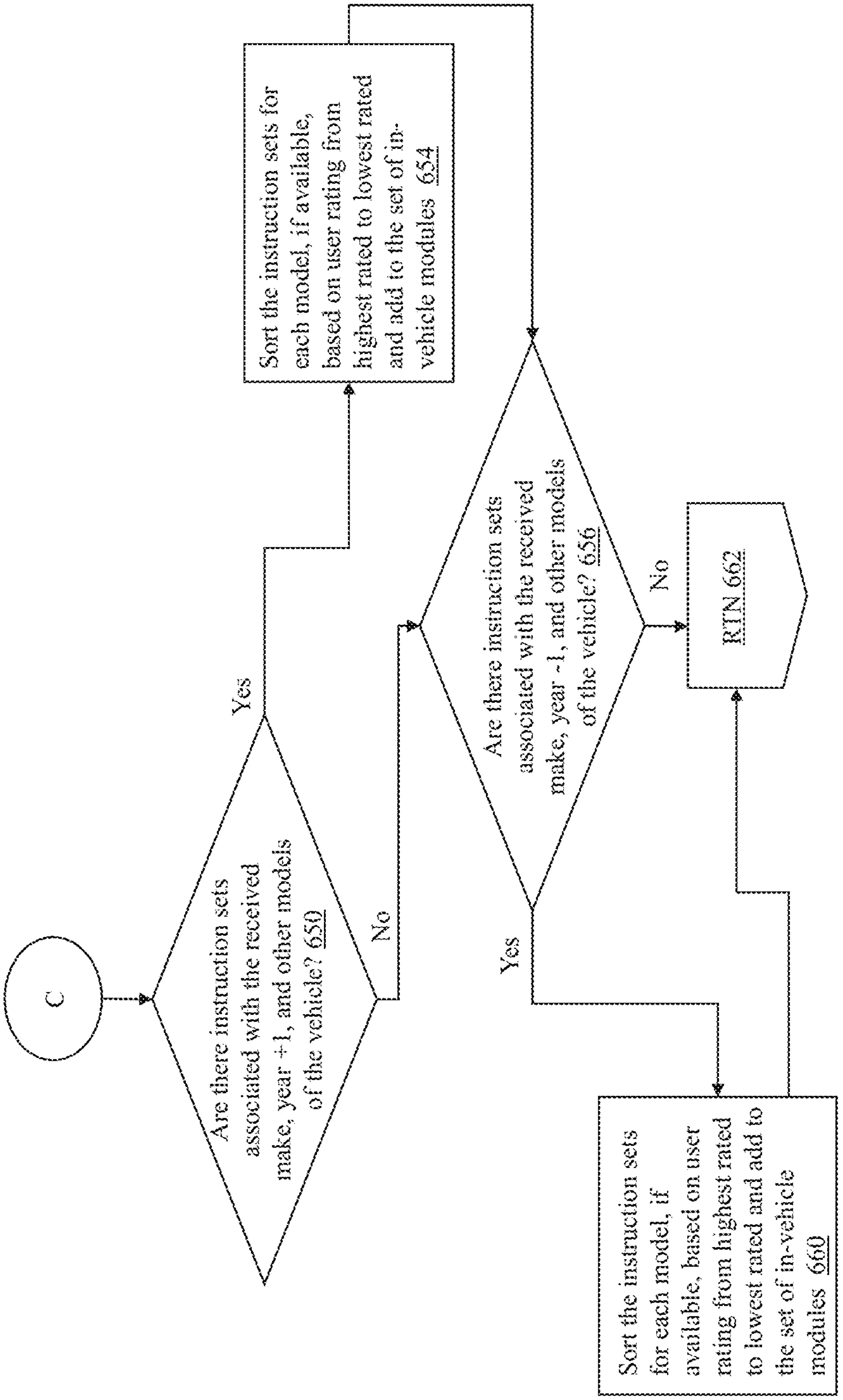

In one example, the confirmation and/or feedback regarding the quality of the images, the match of the images with the actual in-vehicle module, and/or a successful or unsuccessful removal of the privacy information based on the presented instruction set may be provided in the form of star ratings (e.g., 1-5 stars), e.g., 504 of FIG. 5. However, in other examples, any other appropriate mechanism for feedback may be provided without departing from a broader scope of the present disclosure.

In some example embodiments, when an instruction set that is presented based on the user's selection of an image of an in-vehicle module that matches or resembles the actual in-vehicle module 104 does not work, the privacy information removal server 114 may provide an alternate instruction set associated with a make, model, year, and/or trim of another vehicle that closely relates to the make, model, year, and/or trim of the vehicle 102. For example, if the instruction set associated with erasing privacy information from a 2012 Toyota Corolla does not work, then, the privacy information removal server 114 may provide an instruction set associated with erasing privacy information from a 2011 Toyota Corolla, a 2012 Toyota Camry, or a 2012 Toyota Corolla with a different trim level. That is, the alternate instruction set may be for the same make and model of the vehicle, but for another year; or the same make and year, but different model; or the same make and model, but for another trim level, etc.

In some example embodiments, based on the user feedback and comments, if it is determined that the user 106 was able to successfully erase the user's privacy information from the vehicle 102 using an alternate instruction set, then, the user experience engine 227 of the privacy information removal server 114 may de-prioritizes the initially presented instruction set and updates the initially presented instruction set with the alternate instruction set that the user 106 was able to follow to successfully erase privacy information from the in-vehicle module 104 of the vehicle 102. For example, if an initially presented instruction set for erasing privacy information from a 2012 Nissan Rogue SV does not work and instead the alternate instruction set for erasing privacy information from a 2012 Nissan Murano SL works for erasing privacy information from a 2012 Nissan Rogue SV, the user experience engine 227 of the privacy information removal server 114 may deprioritize the initially presented instruction set for the 2012 Nissan Rogue SV and updates the initially presented instruction set with the alternate instruction set for erasing privacy information from the 2012 Nissan Murano SL. Alternatively, the privacy engine 208 and/or the user experience engine 227 may deprioritize the initially presented instruction set for the 2012 Nissan Rogue SV and updates the initially presented instruction set with the alternate instruction set for erasing privacy information from the 2012 Nissan Murano SL based on user feedback (e.g., star ratings) received on both the instruction sets from multiple users over a period of time. In other words, history of user selections and outcome of selections (as determined by the star rating or feedback) may be used to override and/or rearrange the order in which the images (and corresponding instruction sets) of the set of in-vehicle modules (i.e., candidate in-vehicle modules) are presented to the user.

In some example embodiments, in operation 432, initially, one or more images of infotainment systems 502 (shown in FIG. 5) may be presented to the user 106 and the privacy information removal application 110 prompts the user 106 to select the image of an infotainment system (or any other appropriate in-vehicle module 104 from which privacy information is to be deleted) that best matches with the actual infotainment system of the vehicle 102. If none of the presented images match, then, said data may be transmitted back to and logged in the user experience database 226 of the privacy information removal server 114. However, if the one of the images of the infotainment systems presented to the user 106 matches the actual infotainment system of the vehicle 102 and the user selects said image, the privacy information removal server 114 receives the selected image of the infotainment system and responsively, provides a corresponding instruction set 503 for display via the user computing device 108 to delete privacy information from the infotainment system matching the selected image. In another embodiment, after the user selects the image of the actual infotainment system of the vehicle 102, the privacy information removal application 110 may present a representative image of each in-vehicle module and/or submodule associated with the vehicle 102 that is associated with the selected actual infotainment system (e.g., Bluetooth submodule, navigation submodule, garage door module). The user may then select the representative image of the in-vehicle module or submodule from which privacy information is to be removed, and the privacy information removal server 114 receives the selected representative image and responsively provides a corresponding instruction set 503 for display via the user computing device 108 to delete privacy information from the in-vehicle module or submodule associated with the selected representative image. For example, in this embodiment, the one or more images of infotainment systems 502 may include an image of the dashboard of a 2012 Nissan Rogue S, an image of the dashboard of a 2012 Nissan Rogue SL, and an image of the dashboard of a 2012 Nissan Rogue SV (chosen by the system based on a received VIN, for example). The user may then select the image of the dashboard that matches the dashboard of the user's vehicle, and then the privacy information removal application may present representative images of a navigation submodule, a garage door module, and a Bluetooth submodule, as each of the three modules and submodules are associated with the vehicle selected by the user via the selection of the specific dashboard image. For example, if the user selects the 2012 Nissan Rogue SL dashboard image, the privacy information removal application presents representative images of each in-vehicle module and/or submodule associated with a 2012 Nissan Rogue SL. The user may then select one of the representative images for the in-vehicle modules or submodule associated with the user's vehicle, and the privacy information removal application may display via the user computing device 108 the privacy information removal instruction set 503 for the selected in-vehicle module or submodule.

In addition to requesting the user to provide feedback and comments regarding the user's experience of using the provided instruction set to erase the privacy information of the user 102 from the vehicle 102, the privacy information removal application 110 may also prompt the user 106 to rate the privacy protection features and design of the vehicle 102 based on the user's experience with data privacy and security in the vehicle 102. The rating from the user(s) 106 may be stored in the user experience database 226 and used to build a privacy information protection rating for each make, model, year, and/or trim of vehicle. Said privacy protection rating of the vehicle 102 may then be used by third parties (e.g., Edmunds, Consumer Reports, KBB, etc.) or other users to identify makes and models of vehicles having good privacy information protection features, which in turn may influence a user's choice to buy a specific make and model of a vehicle.

In one or more example embodiments, any appropriate authorized user may be provided access to the user experience database 226 (and/or the privacy information removal database 224) to query the user experience database 226 to perform data analysis and generate analysis reports. For example, in a business-to-business model involving a rental agency, authorized users of the rental agency or a system administrator may be provided access to user experience database 226 for data analysis of the vehicles associated with the rental agency using their respective VINs. The data analysis of the VINs may be conducted based on: (a) location, user account, abandoned searches, success rate of instruction set; (b) number of instruction sets executed per user and/or account; (c) Make/Model/Year instructions that successfully deleted user data; (d) make/model/year instructions that did not successfully deleted user data (including feedback and free-flow user comments), etc.

Further, each time an instruction set for erasing privacy information of a user from a vehicle is transmitted to the user computing device and/or upon receiving a confirmation that the transmitted instruction set has been used to successfully erase the privacy information, the usage tracking engine 210 records the usage of the instruction set. Further, the usage tracking engine 210 operates in concert with the billing database 222 to determine: (a) if the user has opted for a per usage or N uses based payment or whether the user is a subscription member, (b) a payment based on the usage, and/or (c) whether the user has exceeded a maximum usage limit. The billing database 222 may also keep records of payment received from the user and update a status of the user, e.g., active, default, etc. Such usage information 515 may also be presented to the user via the computing device 108 as illustrated in FIG. 5.

The processor 212 of the privacy information removal server 114 may be a multi-core processor or a combination of multiple single core processors. Further, the privacy information removal server 114 may include a memory 214 that is coupled to the processor 212. The memory 214 may be non-transitory storage medium, in one embodiment, and a transitory storage medium in another embodiment. The memory 214 may include instructions that may be executed by the processor 212 to perform operations of the privacy information removal server 114. In other words, operations associated with the different engines 202-227 may be executed using the processor 212. Further, the privacy information removal server 114 may be communicatively coupled and communicated with the external data sources 112*a*-*n* and the user computing device 108 via the network interface 216.

Further, in some example embodiments, the privacy information removal system 100 may be configured to offer different languages. That is, in said some examples, the privacy information removal server 114 may be configured to create a technical dictionary or technical terms database that stores different translations of technical terms (e.g., "factory reset", "scroll down" press") and are used in the instruction set provided to the user for removing the privacy information. The technical terms database allows the text included in the instruction sets presented to the user to be converted to a different language of the user's choice or based on the language to which the computing device of the user is set. Further, the technical terms allow the language used in the instruction sets would be standardized.

It is noted that in some example embodiments, all the operations performed by the privacy information removal server 114 (e.g., operations in FIGS. 3, 4, and 6) may be performed at the computing device 108, provided that the computing device has sufficient processing power without departing from a broader scope of the present disclosure.

Figure 7:
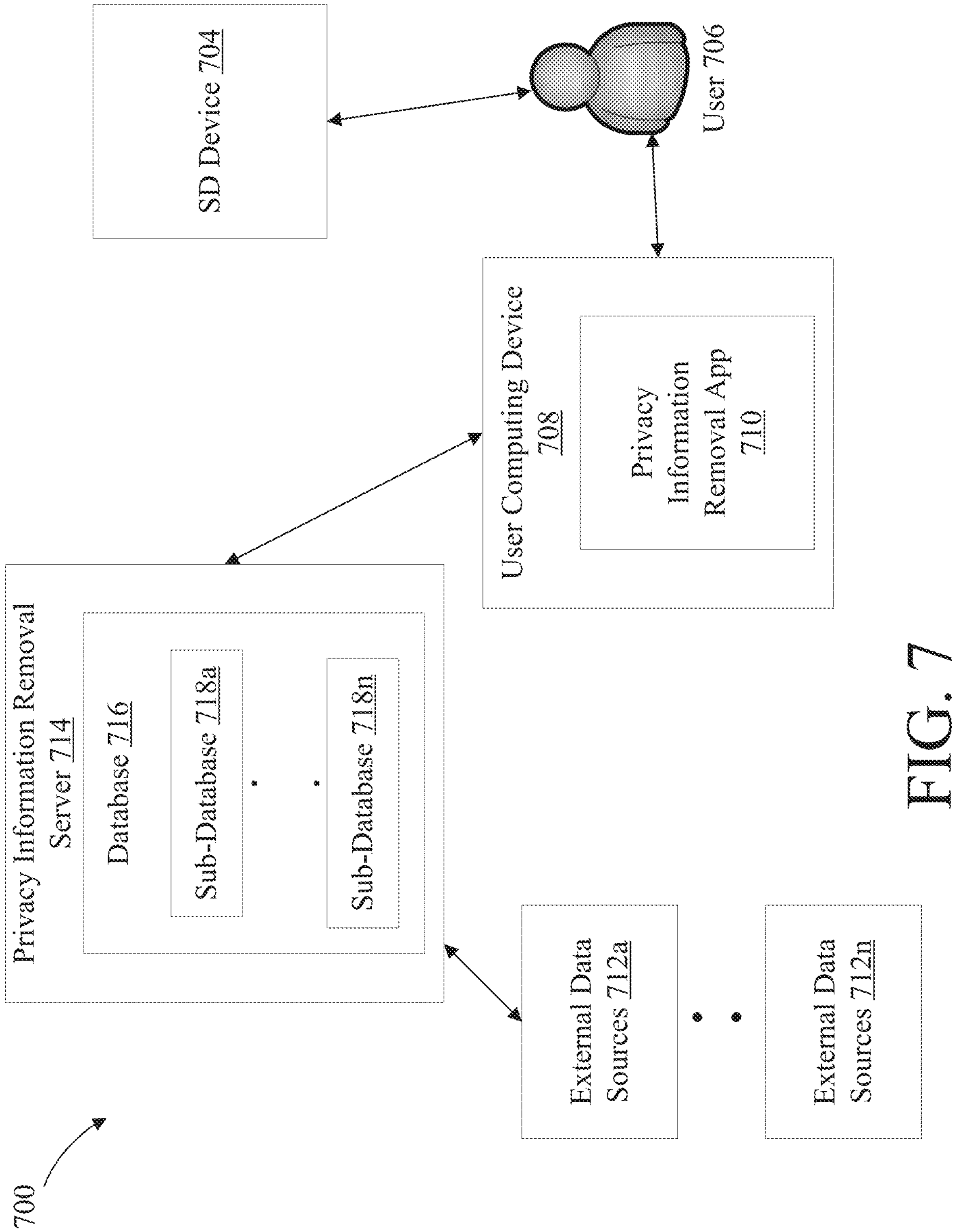
FIG. 7 illustrates an example system architecture of data security and privacy in smart devices, in accordance with example embodiments of the present disclosure.
Figure 8:
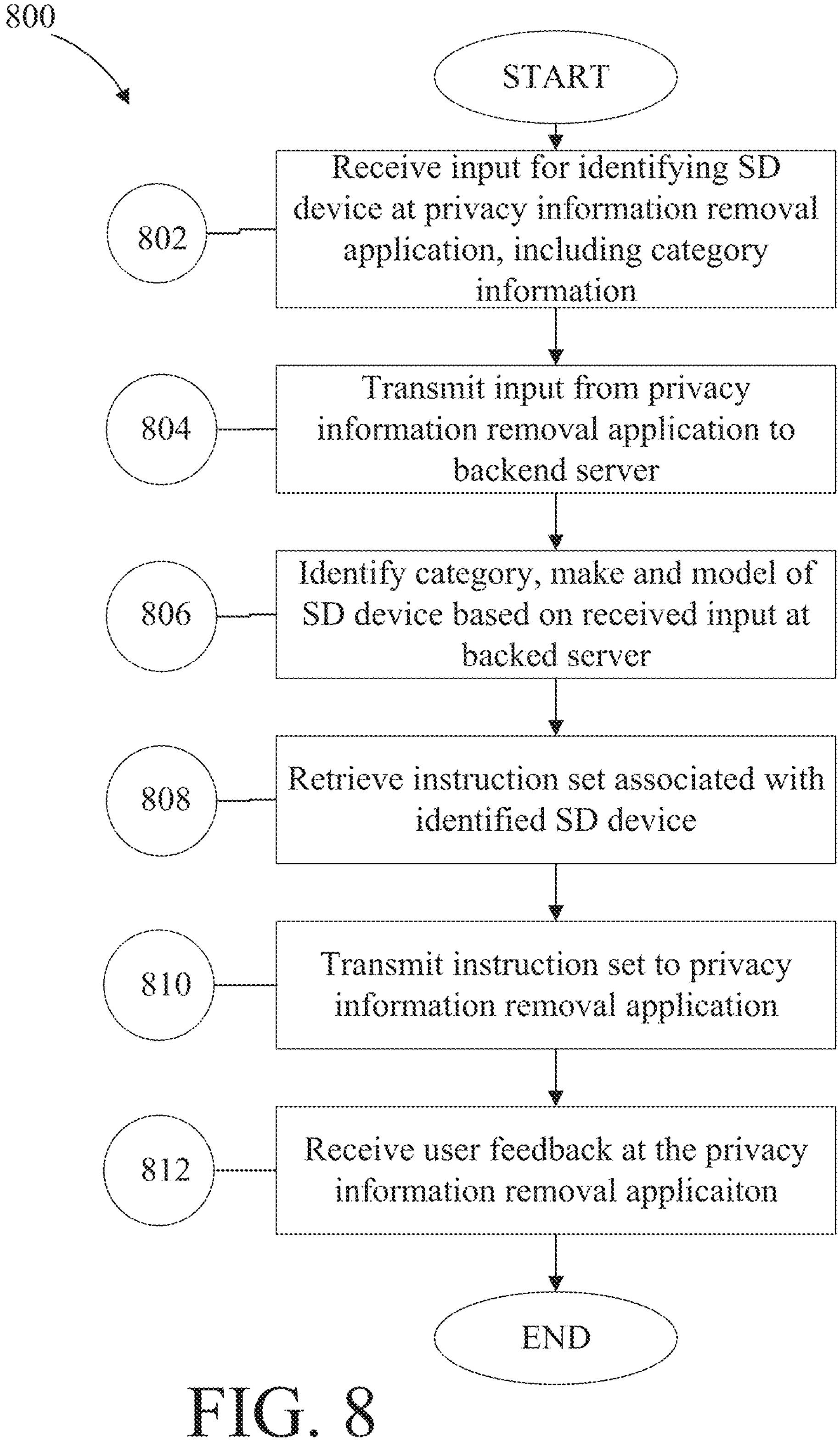
FIG. 8 is a flowchart that illustrates an example method of removing a user's private data from one or more smart devices.

Although the present embodiments have been described with reference to specific example embodiments, it will be evident that various modifications and changes may be made to these embodiments without departing from the broader spirit and scope of the various embodiments. For example, as shown in FIG. 7 and in the operations of FIG. 8, the privacy information removal system 700, which is substantially analogous to privacy information removal system 100, may be utilized with any SD device 704 (substantially analogous to the in-vehicle module 104) that stores personal data of at least one user 706.

In many embodiments, the privacy information removal system 700 may include an SD device 704 that may store privacy information of a user 706 when the user 706 uses the SD device 704. For example, the SD device 704 may be an in-vehicle module 104, as described above, or may be a smart device, such as, but not limited to, a smart refrigerator or smart thermostat, wearable technology such as a smart watch, SD medical devices, and any other SD device or system that stores personal information of the user 706.

In various embodiments, at step 802, the user 706 may provide information associated with the SD device 706, from which privacy information is to be removed, as an input to the application 710 (which is substantially analogous to the application 110) on the computing device 708 (which is substantially analogous to the computing device 108). Such information may include, but is not limited to, the type/category of device (e.g., smartphones, smartwatches, smart TVs, fitness bands or rings, smart speakers, other wearables, toys and games, health devices, fitness equipment, smart speakers, smart thermostats, smart meters, EV chargers, home entertainment equipment, etc.), the manufacturer of the SD device 704, the make/model/year/version of the SD device 704, an image of the SD device 704 captured by the computing device 708, a video of the SD device 704 captured by the computing device 708, a point cloud or other 3D scan of the computing device 704 captured by the computing device 708, and a QR code or a bar code associated with the SD device 704 and scanned with the computing device 708. In many embodiments, at step 804-806, the information input into the computing device 708 by the user 706 may be sent to the backend server 714 that identifies the SD device 704 based on the input information. In some embodiments, at step 808-810, the backend server 714 (which is substantially analogous to the backend server 114) may retrieve an instruction set (which is substantially analogous to the instruction set 503) for removing privacy information from the SD device 704 from a database (in which such database is substantially analogous to the database 224) within the backend server, and transmit the instruction set, which includes step by step textual instructions for removing privacy information from the SD device 704, illustrations, and other types of instructions as disclosed herein, to the computing device 708.

In some embodiments, the database 716 for SD devices 704 may be created in a similar manner as database 224, but instead of vehicle-specific information that is used to create database 224, the database 716 for SD devices 704 within the backend server 714 may be built by collecting data associated with erasing the privacy information in a SD device 704 from multiple external data sources, such as, owner's manuals of the SD devices, manufacturer websites and data stores, third party websites that provide SD device information, video sharing websites, etc. In at least one embodiment, the database 716 for SD devices may include sub-databases 718*a-n*, in which each sub-database 718 is associated with a category of SD device. When a user 706 provides input information for the SD device 704 (either including information regarding the category of the SD device, or information that the system 700 can utilize to deduce the category of the SD device), the backend server 714 may utilized the input information to associate the SD device 704 with a category, and then parse the sub-database 718 associated with the category of SD device 704 to identify the SD device 704 and return the instruction set for the SD device 704 to the computing device 708. For example, a user 706 may provide a model number of a refrigerator and an input that the SD device is a refrigerator to the application 710 on the computing device 708, and the backend server 714 may receive the input and parse a sub-database 718 associated with refrigerators, in order to identify the make and model of the smart refrigerator and return the instruction set associated with the specific smart refrigerator.

In certain embodiments, depending on the input information, the backend server 714 may provide only one instruction set for the SD device 704, or the backend server 714 may provide multiple instruction sets for a set of candidate SD devices, such that the computing device 708 shows images of each of the candidate SD devices to the user 706, and the user 706 selects the image of the candidate SD device 704 from which privacy information is being removed (the "target SD device"). For example, if the input received by the computing device 708 includes the device type, manufacturer model, or identification number of the SD device 704, the backend server 714, via the database, may provide the instruction set associated with specific SD device 704 associated with the input information (or the equivalent generic device, in case of standardization, and illustrated previously). However, if the input received by the computing device 708 includes, for example, only an image of the SD device 704, or only the type of device 704, the backend server 714 may provide multiple instruction sets that may be associated with the SD device 704, and cause the computing device 708 to provide images of a set of candidate SD devices for the user 706 to select from, and the backend server 714 may transmit the instruction set for the target SD device 704.

In another embodiment, the application 710 may provide a drop-down menu or searchable database of device types and/or manufacturers of SD devices on the computing device 708, so that the user 706 may search and select the type and/or manufacturer of the SD device from which privacy information is being removed. Once the user 706 selects the type and/or manufacturer of the SD device 704, the application 710 may provide a list of makes and/or models of various SD devices associated with the selected manufacturer (or the generic device in case of standardization, as illustrated previously), and the user 706 may select the type, make and/or model of the SD device 704 from which privacy information is to be removed.

In either case, once the instruction set associated with the target SD device 704 is sent to the computing device 708, the user 706 may follow the step by step instructions to remove the privacy information from the SD device 704. In at least one embodiment, the instruction set associated with the target SD device 704 may include additional instructions for activating or deactivating privacy modes from the SD device 704, activating and deactivating location services and/or connected services from the SD device 704, removing other users from being able to access connected services and information of the SD device 704, terminating subscription or free/freemium services that include privacy implications on the SD device 704, modifying the privacy information consent for subscription or free/freemium services on the SD device 704, and activating or deactivating pairing between the computer device 708 and the SD device 704.

Figure 9:
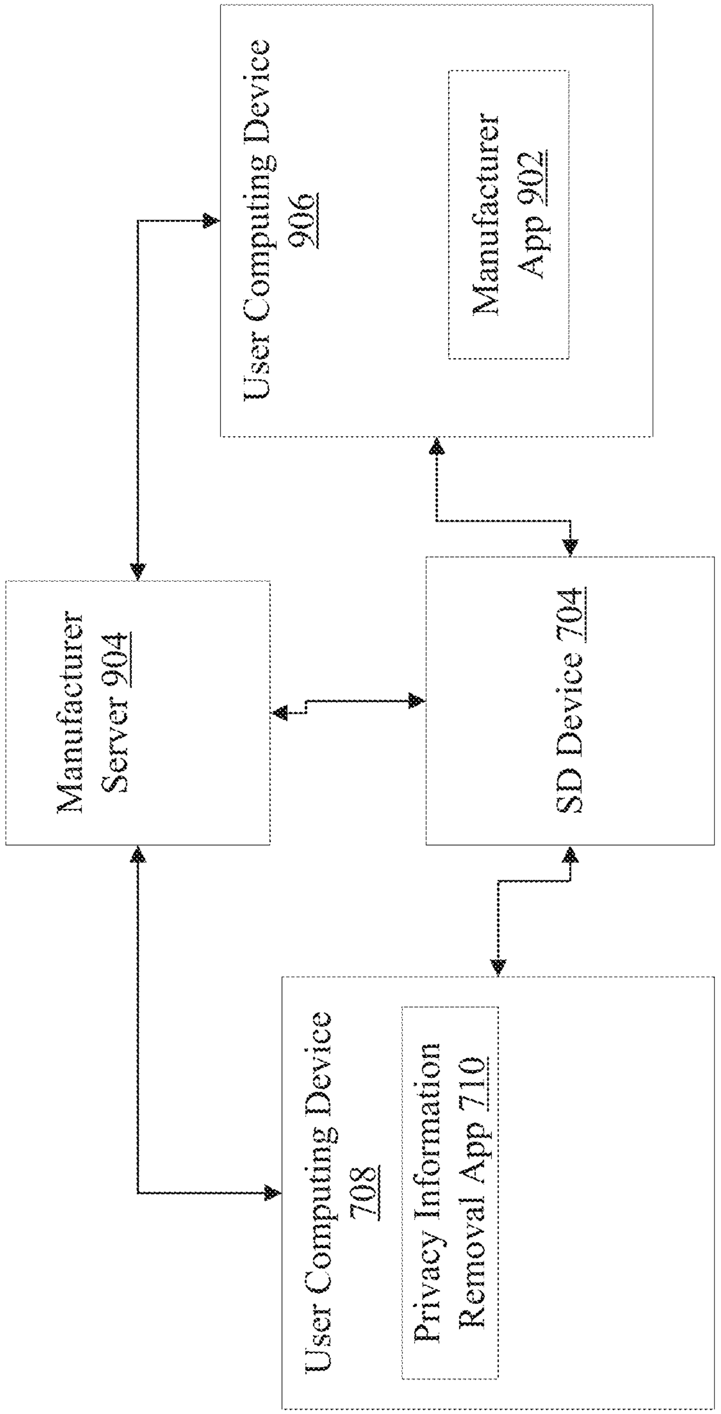
FIG. 9 illustrates an example system architecture of data security and privacy in smart devices in communication with third party servers, in accordance with example embodiments of the present disclosure.

In some embodiments, in addition to instructions for removing privacy information from the SD Device, the instruction set may include additional instructions for activating or deactivating privacy modes from each in-vehicle module of the set of in-vehicle modules, activating and deactivating location services and/or connected services from each in-vehicle module of the set of in-vehicle modules, removing other users from being able to access connected services and information, terminating subscription or free/freemium services that include privacy implications (SiriusXM, Spotify, etc.), modifying the privacy information consent for subscription or free/freemium services, and activating or deactivating pairing between the computer device 108 and the vehicle 102, including deauthorization of certain users, modules, or devices, user account resets, deletion of connected apps, etc. For example, as shown in FIG. 9, a user 706 may have the privacy information removal app 710 downloaded on the computing device 708 and may use it to delete, remove, or otherwise deauthorize, an authentication key/token/saved setting stored on the SD device 704 so to stop communication with the manufacturer server 904 and the other user computing device 906 or otherwise stop certain communications between them, wherein the computing device 708 is in communication at least the manufacturer's server 904. The other user computing device 906 may also have an authentication key/token/saved setting that is stored on the SD device 704 and the manufacturer's server 904. In addition to step by step instructions for removing privacy information from the SD device 704, the instruction set may include step by step instructions on removing the authentication key/token/saved setting or otherwise breaking the pairing between the SD device 704 and the user computing device 906) or otherwise stop certain communications between them, wherein the user computing device 906 is another computing device that is paired with SD device 704 (e.g., the computing device of a prior owner of the SD device 704). The user computing device 906 may include a manufacturer application 902, which is the software application that connects to the manufacturer server 904 and the SD device 704. Specifically, the instruction set may provide instructions on how to remove the authentication key/token/saved setting of the user computing device 906 through the manufacturer mobile application 902 on the other user computing device 906, through the manufacturer server 904, and/or through the SD device 704 (e.g., a user interface on the SD device 704). Once the user 706 breaks the pairing between the manufacturers mobile application 902 on the user computing device 906 and the SD device 704, the computing device 906 may no longer send or receive personally identifiable information to or from the manufacturer server 904 regarding the SD device 704 or otherwise reduce or constraint the data collection, usage, sharing, or selling. For example, a user 706 may receive instructions from the privacy information removal app 710 to break the authentication key relationship between a previous user computing device 906 and a SD device 704. The instructions may allow the user 706 to interact with the SD device 704 to break the authentication key relationship, which would be communicated from the SD device 704 to the manufacturer server 904, and then communicated with the user computing device 906 through the manufacturer app 902. In another embodiment, the user 706 may receive instructions on the user computing device 708, and, through an API or some other communication method, the user 706 may cause the privacy information removal app 710 to send a communication to the manufacturer server 904 to break the authentication key relationship between the SD device 704 and the user computing device 906. Once the authentication key relationship is broken at the manufacturer server 904, the relationship change is propagated to the SD device 704 and the user computing device 906 through the manufacturer app 902, and the user of the user computing device 906 no longer can access the SD device 704 or any information thereof.

In multiple embodiments, at step 812, the front-end application 710 may prompt the user to provide feedback on the quality of the experience, for example: (a) whether the displayed images of SD devices matched the actual SD device 704 from which privacy information was to be removed, (b) whether the user was able to successfully erase the privacy information from the SD device 704 using the instruction set, and/or (c) whether the user's SD device 704 was included as part of the available instruction set(s). The feedback received may be in the form of comments, selections to prompts, images of the SD device 704, a voice recording, and/or the pressing of a button to submit or confirm the end of the data clearing process after the privacy information is removed. For example, after the user 706 has received the step by step instructions for removing privacy information from the SD device 704, the front-end application 710 may present a prompt to the user 706 that asks the user 706 to confirm whether the user successfully removed the privacy information (or otherwise completed the procedure outlined in the instructions), and after confirmation that the user 706 was successful, the front-end application 710 may present a comment box so that the user 706 can write and upload comments. In another embodiment, after the user 706 has received the step by step instructions for removing privacy information from the SD device 704, the front-end application 710 may launch an in-application camera function that allows the user 706 to capture and upload an image of the SD device 704 that the user 706 just erased privacy information from. If the displayed images do not match the actual SD device 704 and/or the user 706 was not able to successfully erase the privacy information by following the instruction set, the front-end application 710 further allows the user 706 to provide comments, one or more images of the SD device 704, and/or may provide the user 706 with alternate instruction sets. The feedback and comments provided by the user 706 are transmitted to the backend server 714 to be logged for further analysis and/or reworking of the existing instruction sets. Furthermore, the front-end application 710 may prompt the user to rate privacy information protection features and design of the specific make, model, and/or year of the SD device 704 which can then be used by other users to determine a data security and privacy standard of SD devices of the same make, model, and/or trim, for example, when the other users are planning to buy or sell an SD device.

Additionally, the various devices and modules described herein may be enabled and operated using hardware circuitry (e.g., CMOS based logic circuitry), firmware, software or any combination of hardware, firmware, and software (e.g., embodied in a machine readable medium) are within the scope of this disclosure. For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:

obtaining, by a user computing device, category information and identifying information associated with a target smart device from which privacy information is to be removed;

determining, by the user computing device, device parameters associated with the target smart device based at least in part on the category information and the identifying information associated with the target smart device;

obtaining, by the user computing device, a privacy information removal file based on the device parameters associated with the target smart device, wherein the privacy information removal file comprises a plurality of instruction sets for a corresponding plurality of candidate smart devices;

presenting, by the user computing device, a series of images corresponding to the plurality of candidate smart devices arranged in a ranked order based on a degree of similarity to the target smart device;

receiving, by the user computing device, a selection of one of the series of images identifying one of the plurality of instruction sets associated with removing privacy information from the target smart device;

presenting, by the user computing device, the one of the plurality of instruction sets corresponding to the selected one of the series of images;

obtaining, by the user computing device, a user experience feedback; and removing, by the user computing device using one or more of an Application Programming Interface (API), a webserver, or a mobile application, the privacy information from the target smart device.

2. The method of claim 1, wherein the category information associated with the target smart device comprises a type of smart device.

3. The method of claim 2, wherein obtaining the category information associated with the target smart device comprises:

presenting, by the user computing device, a list of types of smart devices, wherein the list of types of smart devices includes the type of smart device associated with the target smart device; and obtaining, by the user computing device, a selection of the type of smart device associated with the target smart device.

4. The method of claim 2, wherein obtaining the category information associated with the target smart device comprises:

capturing, by a camera of the user computing device, at least one of: a QR code or bar code associated with the target smart device, a model number associated with a make, model, or model year of the target smart device, one or more images of the target smart device, or a video of the target smart device; and determining, by the user computing device, the category information of the target smart device based on at least one of the captured QR code or bar code associated with the target smart device, the model number associated with the make, model, or model year of the target smart device, the one or more images of the target smart device, or the video of the target smart device.

5. The method of claim 1, wherein the identifying information associated with the target smart device comprises at least one of: a manufacturer of the target smart device, a make of the target smart device, a model of the target smart device, a model year of the target smart device, one or more images of the target smart device, a video of the target smart device, or a point cloud of the target smart device.

6. The method of claim 5, wherein obtaining the identifying information associated with the target smart device comprises capturing, by a camera of the user computing device, at least one of: a QR code or bar code associated with the make, the model, or model year of the target smart device, a model number associated with the model of the target smart device, one or more images of the target smart device, or a video of the target smart device.

7. The method of claim 5, wherein obtaining the identifying information associated with the target smart device comprises:

presenting, by the user computing device, a list of manufacturers of smart devices associated with the category information associated with the target smart device;

obtaining, by the user computing device, a selection of the manufacturer of the target smart device from the list of manufacturers of smart devices associated with the category information for the target smart device;

presenting, by the user computing device, a list of makes and models of smart devices associated with the selected manufacturer; and obtaining, by the user computing device, a selection of at least one of the make or the model associated with the target smart device.

8. The method of claim 1, wherein the one of the plurality of instruction sets corresponding to the selected one of the series of images comprises at least one of: instructions for activating or deactivating privacy modes from the target smart device, activating and deactivating location services or connected services from the target smart device, removing other users from accessing connected services and information of the target smart device, terminating subscription or free services that comprise privacy implications on the target smart device, modifying a privacy information consent for subscription or free services on the target smart device, and activating or deactivating pairing between the user computing device and the target smart device.

9. A system, comprising:

a user computing device; and at least one application executable by the user computing device, wherein the at least one application, when executed by the user computing device, is configured to cause the user computing device to:

obtain category information and identifying information associated with a target smart device from which privacy information is to be removed;

determine device parameters associated with the target smart device based at least in part on the category information and the identifying information associated with the target smart device;

obtain a privacy information removal file based on the device parameters associated with the target smart device, wherein the privacy information removal file comprises a plurality of instruction sets for a corresponding plurality of candidate smart devices;

present a series of images corresponding to the plurality of candidate smart devices arranged in a ranked order based on a degree of similarity to the target smart device;

receive a selection of one of the series of images identifying one of the plurality of instruction sets associated with removing privacy information from the target smart device;

present the one of the plurality of instruction sets corresponding to the selected one of the series of images;

obtain a user experience feedback; and remove, using one or more of an Application Programming Interface (API), a webserver, or a mobile application, the privacy information from the target smart device.

10. The system of claim 9, wherein the category information associated with the target smart device comprises a type of smart device.

11. The system of claim 10, wherein the at least one application causes the user computing device to obtain the category information associated with the target smart device by:

presenting a list of types of smart devices, wherein the list of types of smart devices includes the type of smart device associated with the target smart device; and obtaining a selection of the type of smart device associated with the target smart device.

12. The system of claim 10, wherein the at least one application causes the user computing device to obtain the category information associated with the target smart device by:

capturing, by a camera of the user computing device, at least one of: a QR code or bar code associated with the target smart device, a model number associated with a make, model, or model year of the target smart device, one or more images of the target smart device, or a video of the target smart device; and determining the category information of the target smart device based on at least one of the captured QR code or bar code associated with the target smart device, the model number associated with the make, model, or model year of the target smart device, the one or more images of the target smart device, or the video of the target smart device.

13. The system of claim 9, wherein the identifying information associated with the target smart device comprises at least one of: a manufacturer of the target smart device, a make of the target smart device, a model of the target smart device, a model year of the target smart device, one or more images of the target smart device, a video of the target smart device, or a point cloud of the target smart device.

14. The system of claim 13, wherein the at least one application causes the user computing device to obtain the identifying information associated with the target smart device by: capturing, by a camera of the user computing device, at least one of: a QR code or bar code associated with the make, the model, or model year of the target smart device, a model number associated with the model of the target smart device, one or more images of the target smart device, or a video of the target smart device.

15. The system of claim 13, wherein the at least one application causes the user computing device to obtain the identifying information associated with the target smart device by:

presenting a list of manufacturers of smart devices associated with the category information associated with the target smart device;

obtaining a selection of the manufacturer of the target smart device from the list of manufacturers of smart devices associated with the category information for the target smart device;

presenting a list of makes and models of smart devices associated with the selected manufacturer; and obtaining a selection of at least one of the make or the model associated with the target smart device.

16. The system of claim 9, wherein the one of the plurality of instruction sets corresponding to the selected one of the series of images comprises at least one of: instructions for activating or deactivating privacy modes from the target smart device, activating and deactivating location services or connected services from the target smart device, removing other users from accessing connected services and information of the target smart device, terminating subscription or free services that comprise privacy implications on the target smart device, modifying a privacy information consent for subscription or free services on the target smart device, and activating or deactivating pairing between the user computing device and the target smart device.

17. The system of claim 9, wherein the at least one application is further configured to cause the user computing device to remove, via one or more Application Programming Interfaces (APIs), the privacy information from the target smart device.

18. A non-transitory computer-readable medium storing a plurality of computer instructions executable by a user computing device, the plurality of computer instructions being configured to cause the user computing device to at least:

obtain category information and identifying information associated with a target smart device from which privacy information is to be removed;

determine device parameters associated with the target smart device based at least in part on the category information and the identifying information associated with the target smart device;

obtain a privacy information removal file based on the device parameters associated with the target smart device, wherein the privacy information removal file comprises a plurality of instruction sets for a corresponding plurality of candidate smart devices;

present a series of images corresponding to the plurality of candidate smart devices arranged in a ranked order based on a degree of similarity to the target smart device;

receive a selection of one of the series of images identifying one of the plurality of instruction sets associated with removing privacy information from the target smart device;

present the one of the plurality of instruction sets corresponding to the selected one of the series of images;

obtain a user experience feedback; and remove, using one or more of an Application Programming Interface (API), a webserver, or a mobile application, the privacy information from the target smart device.

19. The non-transitory computer readable medium of claim 18, wherein the one of the plurality of instruction sets corresponding to the selected one of the series of images comprises at least one of: instructions for activating or deactivating privacy modes from the target smart device, activating and deactivating location services or connected services from the target smart device, removing other users from accessing connected services and information of the target smart device, terminating subscription or free services that comprise privacy implications on the target smart device, modifying a privacy information consent for subscription or free services on the target smart device, and activating or deactivating pairing between the user computing device and the target smart device.

* * * * *